(12) United States Patent
Nusier et al.

(10) Patent No.: US 11,850,931 B2
(45) Date of Patent: Dec. 26, 2023

(54) VEHICLE FRAMES FOR BATTERY POWERED ELECTRIC VEHICLES

(71) Applicant: Ford Global Technologies, LLC, Dearborn, MI (US)

(72) Inventors: Saied Nusier, Canton, MI (US); Ridha Baccouche, Ann Arbor, MI (US); Saeed David Barbat, Novi, MI (US); Leonard Anthony Shaner, New Baltimore, MI (US); Srinivasan Sundararajan, Ann Arbor, MI (US); Rahul Arora, Birmingham, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 182 days.

(21) Appl. No.: 17/204,610

(22) Filed: Mar. 17, 2021

(65) Prior Publication Data

US 2022/0297521 A1 Sep. 22, 2022

(51) Int. Cl.
*B60K 1/04* (2019.01)
*B62D 25/20* (2006.01)
*B62D 21/06* (2006.01)
*B62D 21/15* (2006.01)
*B62D 21/02* (2006.01)

(52) U.S. Cl.
CPC ............... *B60K 1/04* (2013.01); *B62D 21/02* (2013.01); *B62D 21/06* (2013.01); *B62D 21/155* (2013.01); *B62D 25/2018* (2013.01); *B60K 2001/0411* (2013.01)

(58) Field of Classification Search
CPC .. B60K 1/04; B60K 2001/0411; B62D 21/02; B62D 21/06; B62D 21/155; B62D 25/2018; Y02T 10/7072

USPC ......................................................... 280/781
See application file for complete search history.

(56) References Cited

U.S. PATENT DOCUMENTS

| 1,917,894 | A  | * | 7/1933  | MacPherson | B62D 21/02 180/312 |
| 7,273,230 | B2 | * | 9/2007  | Kiel       | B62D 21/02 180/311 |
| 7,469,957 | B1 | * | 12/2008 | Boettcher  | B62D 25/2018 296/193.07 |
| 7,806,467 | B2 | * | 10/2010 | Sangu      | B60N 2/015 296/187.11 |

(Continued)

FOREIGN PATENT DOCUMENTS

DE 202016107008 U1 * 5/2017 ............... B60K 1/04

*Primary Examiner* — Paul N Dickson
*Assistant Examiner* — Caitlin Anne Miller
(74) *Attorney, Agent, or Firm* — Lorne Forsythe; Hanley, Flight & Zimmerman, LLC

(57) ABSTRACT

Vehicle frames for battery powered electric vehicles are disclosed. An example apparatus disclosed herein includes a vehicle subframe including a first rail and a first rocker on a first side of the vehicle subframe, and a second rail and a second rocker on a second side of the vehicle subframe, the first side opposite the second side, a first diagonal member coupled between the first rail and the second side of the vehicle subframe, the first diagonal member to transfer a first longitudinal load from the first rail to the second side, and a second diagonal member coupled between the second rail and the first side of the vehicle subframe, the second diagonal member to transfer a second longitudinal load from the second rail to the first side.

18 Claims, 16 Drawing Sheets

(56) References Cited

U.S. PATENT DOCUMENTS

| | | | | |
|---|---|---|---|---|
| 7,810,878 | B2* | 10/2010 | Nakamura | B62D 21/11 296/203.02 |
| 7,905,503 | B2* | 3/2011 | Goto | B62D 25/088 280/124.109 |
| 8,052,204 | B2* | 11/2011 | Boettcher | B62D 21/02 296/29 |
| 8,303,030 | B2* | 11/2012 | Baccouche | B60R 19/24 296/203.02 |
| 8,585,132 | B2* | 11/2013 | Klimek | B62D 25/082 296/193.07 |
| 8,602,454 | B1* | 12/2013 | Baccouche | B60K 1/04 180/68.5 |
| 9,493,188 | B2* | 11/2016 | Atsumi | B62D 21/15 |
| 9,616,939 | B2* | 4/2017 | Natsume | B62D 25/20 |
| 9,656,693 | B2* | 5/2017 | Cho | B62D 21/08 |
| 9,937,781 | B1* | 4/2018 | Bryer | B62D 35/02 |
| 10,040,487 | B2* | 8/2018 | Kabayama | B60G 11/27 |
| 10,150,509 | B2* | 12/2018 | McConnell | B62D 21/155 |
| 10,766,348 | B2* | 9/2020 | Fukui | B62D 21/09 |
| 10,899,213 | B2* | 1/2021 | Baccouche | B60K 1/04 |
| 2004/0108754 | A1* | 6/2004 | Igarashi | B62D 25/087 296/204 |
| 2017/0259853 | A1* | 9/2017 | Leanza | B62D 25/082 |
| 2022/0032758 | A1* | 2/2022 | Kaneko | B62D 21/11 |
| 2022/0134857 | A1* | 5/2022 | Baccouche | H01M 50/242 180/68.5 |
| 2022/0153352 | A1* | 5/2022 | Mukaigawa | B62D 25/085 |
| 2022/0305896 | A1* | 9/2022 | Kashihara | B62D 21/157 |
| 2022/0324312 | A1* | 10/2022 | Marginet | B60K 1/04 |
| 2023/0072159 | A1* | 3/2023 | Atsumi | B62D 25/14 |

* cited by examiner

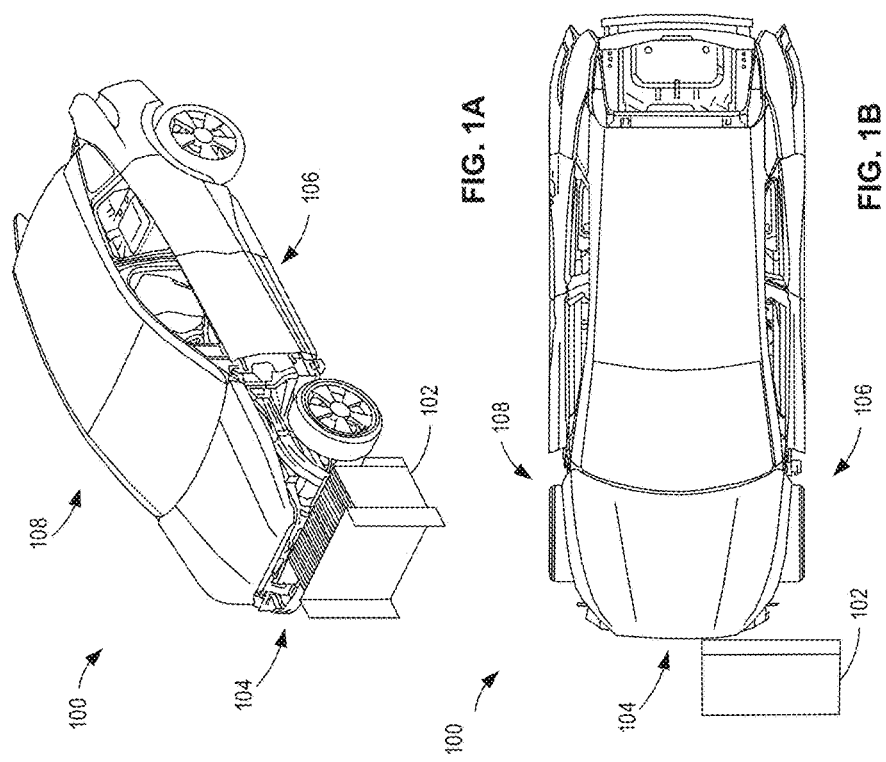

US 11,850,931 B2

1

VEHICLE FRAMES FOR BATTERY POWERED ELECTRIC VEHICLES

FIELD OF THE DISCLOSURE

This disclosure relates generally to vehicles, and, more particularly, to a vehicle frames for battery powered electric vehicles.

BACKGROUND

In recent years, designs for battery powered electric vehicles (e.g., BEVs) have focused on increasing a travel range of the BEVs and, in turn, reducing a frequency of charging required by the BEVs. Typically, long range BEVs require a larger battery to accommodate the increase in travel range. As such, a frame of the BEVs is extended laterally and/or longitudinally to support the larger battery and/or to protect the battery from damage during certain crash events.

SUMMARY

An example apparatus disclosed herein includes a vehicle subframe including a first rail and a first rocker on a first side of the vehicle subframe, and a second rail and a second rocker on a second side of the vehicle subframe, the first side opposite the second side. A first diagonal member is coupled between the first rail and the second side of the vehicle subframe. The first diagonal member is to transfer a first longitudinal load from the first rail to the second side. A second diagonal member is coupled between the second rail and the first side of the vehicle subframe. The second diagonal member is to transfer a second longitudinal load from the second rail to the first side.

An example vehicle frame disclosed herein includes a front frame coupled to a mid frame. A first bent beam is coupled to the front frame. The first bent beam includes a rearward bend at a midpoint of the first bent beam. A second bent beam is coupled to the mid frame. The second bent beam includes a forward bend. The second bent beam is coupled to the first bent beam at the midpoint.

An example apparatus disclosed herein includes a frame of a vehicle. A truss-embedded cross-member is coupled between a front frame and a mid frame of the frame. The truss-embedded cross-member is to include a lateral beam coupled between outer elbows of the mid frame, and truss beams coupled to the lateral beam at a midpoint of the lateral beam, and further coupled to inner elbows of the front frame, and a front horn brace coupled between a first end and a second end of the front frame. The front horn brace proximate a front of the vehicle.

BRIEF DESCRIPTION OF THE DRAWINGS

FIG. 1A illustrates an example vehicle on which examples disclosed herein can be implemented.

FIG. 1B illustrates a top view of the example vehicle of FIG. 1A on which examples disclosed herein can be implemented.

Figure 2A:
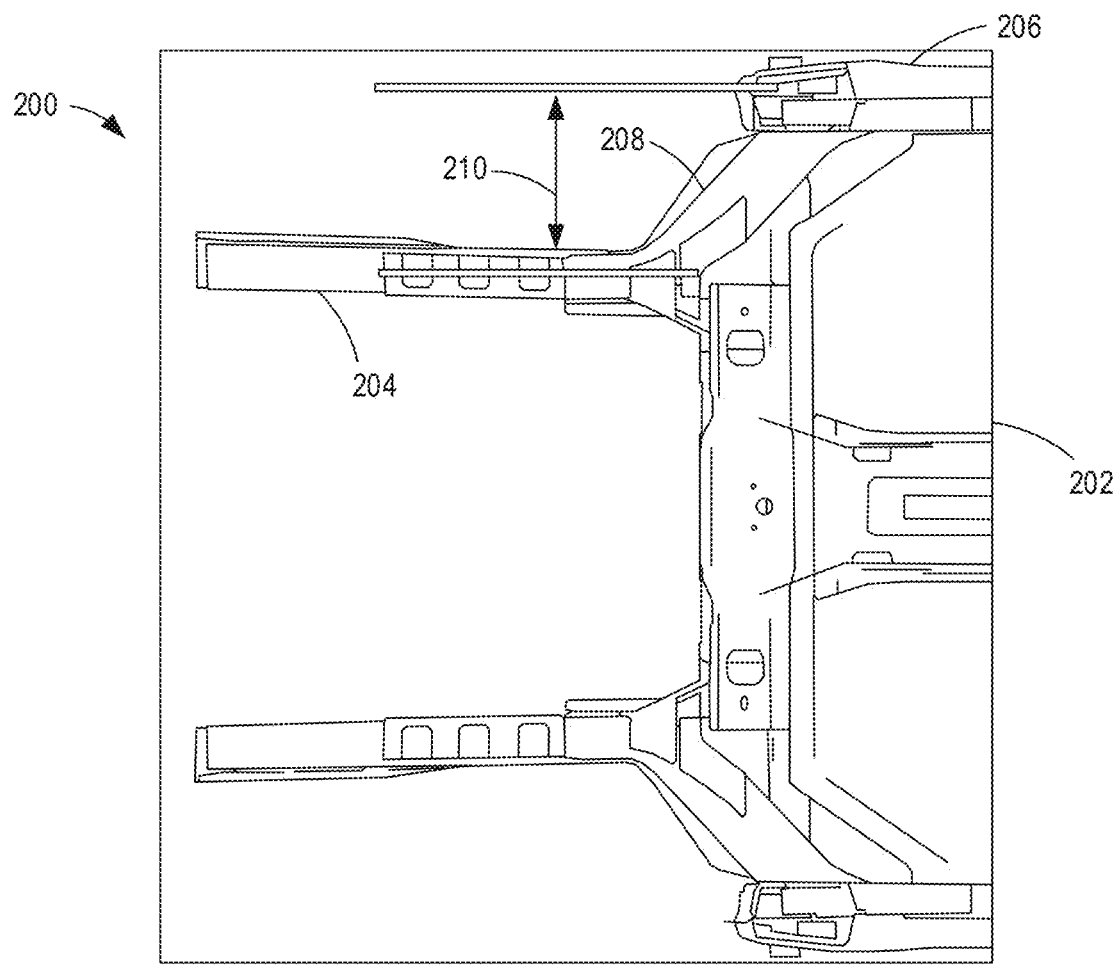
FIG. 2A illustrates a top view of an example subframe that can be implemented on the example vehicle of FIGS. 1A and/or 1B.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A battery powered electric vehicle (BEV), compared to a conventional fuel-driven internal combustion engine (ICE) vehicle, is powered using multiple batteries and/or battery packs. In examples disclosed herein, the multiple batteries and/or battery packs are herein referred to as a battery. A travel range of the vehicle typically depends on a size of the battery, where the travel range refers to a distance that can be traveled by the vehicle for a single charge of the battery. In some cases, the travel range can be increased by increasing the size of the battery.

Many existing vehicle frames may not have been originally configured to support a larger battery. As such, the vehicle frames for long-range BEVs may be modified to accommodate larger batteries. In particular, the mid frames can be extended forward on the vehicle (e.g., to a position proximate a dash of the vehicle) and/or widened along sides of the vehicle. However, widening and/or extending the mid frames may result in the battery becoming damaged in certain crash events. This may result in higher service and repair cost for the battery system.

Examples disclosed herein minimize deformation of the frame and/or the battery under impact of the front and/or sides of the vehicle. Examples disclosed herein can be implemented on vehicles with a subframe-driven design (e.g., unibody vehicles having a subframe), and/or can be implemented on vehicles with a frame-driven design (e.g., body-on-frame vehicles). An example vehicle frame disclosed herein includes supporting beams coupled between side rails of the frame, where the supporting beams transfer a longitudinal load, in whole or in part, from the side rails to respective rockers on opposite sides of the side rails. In such examples, the longitudinal load can be generated during collision of the vehicle with another object. Additionally or alternatively, the example vehicle frame disclosed herein includes a cross-member coupled between mid rails of the vehicle frame. In some examples, the cross-member is a straight beam. In other examples, the cross-member includes a forward bend. In examples disclosed herein, the cross-member can be further coupled to front rails of the vehicle frame via one or more additional beams to transfer the longitudinal load from the front rails to the mid rails. By transferring the longitudinal load to the side rails and/or the mid rails of the subframe, examples disclosed herein reduce deformation of the frame and, in turn, reduce damage to the battery during certain vehicle collisions.

FIG. 1A illustrates an example vehicle 100 on which examples disclosed herein can be implemented, and FIG. 1B illustrates a top view of the example vehicle 100. The vehicle 100 of FIGS. 1A and/or 1B is a BEV and, as such, is powered by a battery (not shown) coupled to the vehicle 100. In the illustrated example of FIGS. 1A and 1B, the vehicle 100 is shown colliding with an example object 102. In some examples, the object 102 can be a static object (e.g., a wall, a barrier, etc.), or can be a moving object (e.g., another vehicle). In the illustrated example of FIGS. 1A and 1B, the vehicle 100 is experiencing a frontal collision in which the object 102 is colliding an example front end 104 of the vehicle 100. In other examples, a side collision can occur in response to the object 102 colliding with an example left side 106 and/or an example right side 108 of the vehicle 100.

FIG. 2A illustrates a top view of an example subframe 200 that can be implemented on the example vehicle 100 of FIGS. 1A and/or 1B. In the illustrated example of FIG. 2A, a front end of the example subframe 200 surrounds and/or encases an example battery 202. In some examples, the battery 202 includes multiple batteries and/or battery packs operatively coupled together. The front end of the example subframe 200 further includes an example mid rail 204, an example rocker 206, and an example backup rail 208 coupled between the mid rail 204 and the rocker 206. In the illustrated example of FIG. 2A, an example outboard offset 210 is shown between the mid rail 204 and the rocker 206. For example, in response to an increase in the size of the battery 202, the outboard offset 210 is increased correspondingly. In particular, a widened frame for the front end of the subframe 200 can be used for long-range vehicles in which the size of the battery 202 must be increased.

Figure 2B:
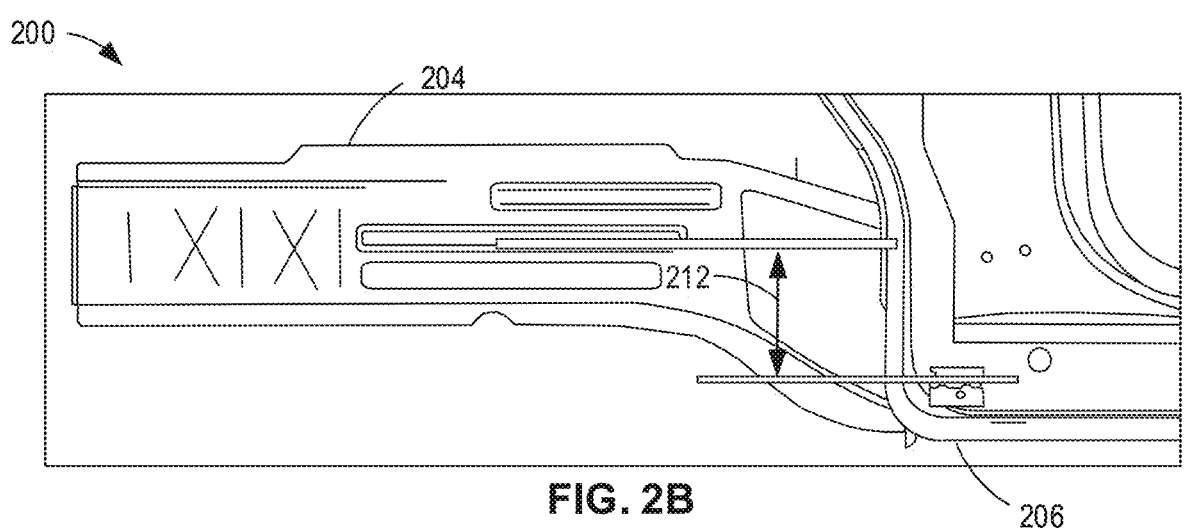
FIG. 2B illustrates a side view of the example subframe of FIG. 2A.

FIG. 2B illustrates a side view of the front end of the example subframe 200 of FIG. 2A. In the illustrated example of FIG. 2B, the front end of the subframe 200 includes an example downward offset 212 between the rocker 206 and the mid rail 204. In some examples, downward offset 212 is increased to accommodate the increased size of the battery 202 of FIG. 2A. In examples disclosed herein, as a result of increasing the outboard offset 210 of FIG. 2A and/or the downward offset 212 of FIG. 2B, the battery 202 may be more vulnerable to damage in the event of a vehicle collision.

Figure 3A:
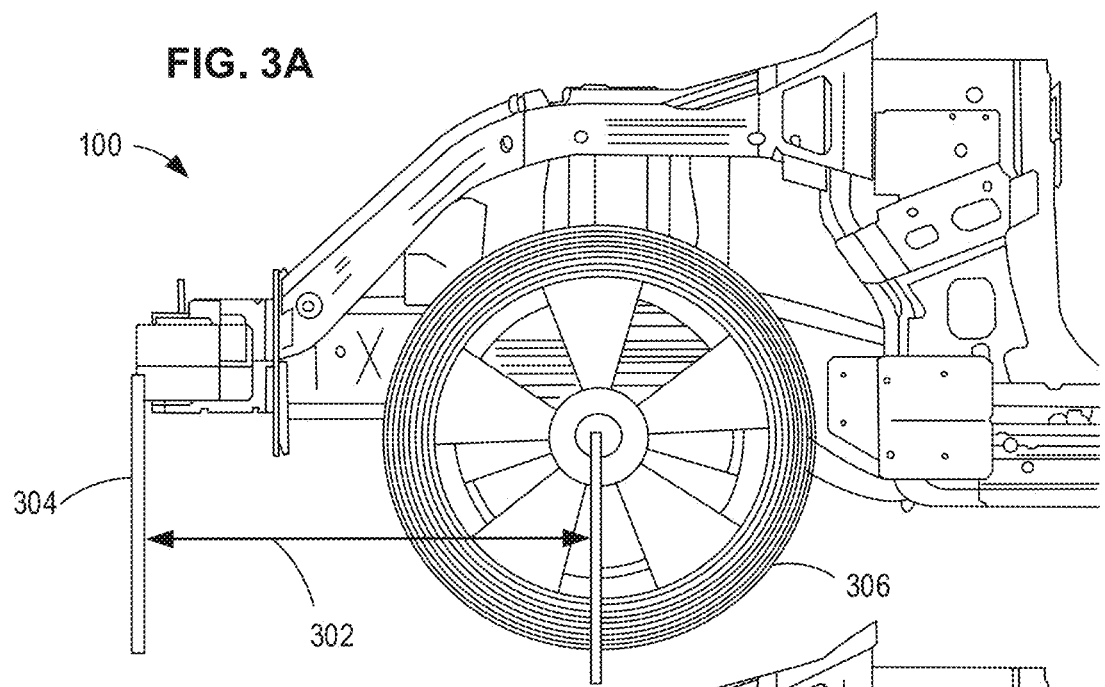
FIG. 3A illustrates a side view of the example vehicle of FIGS. 1A and/or 1B having an example overhang.
Figure 3B:
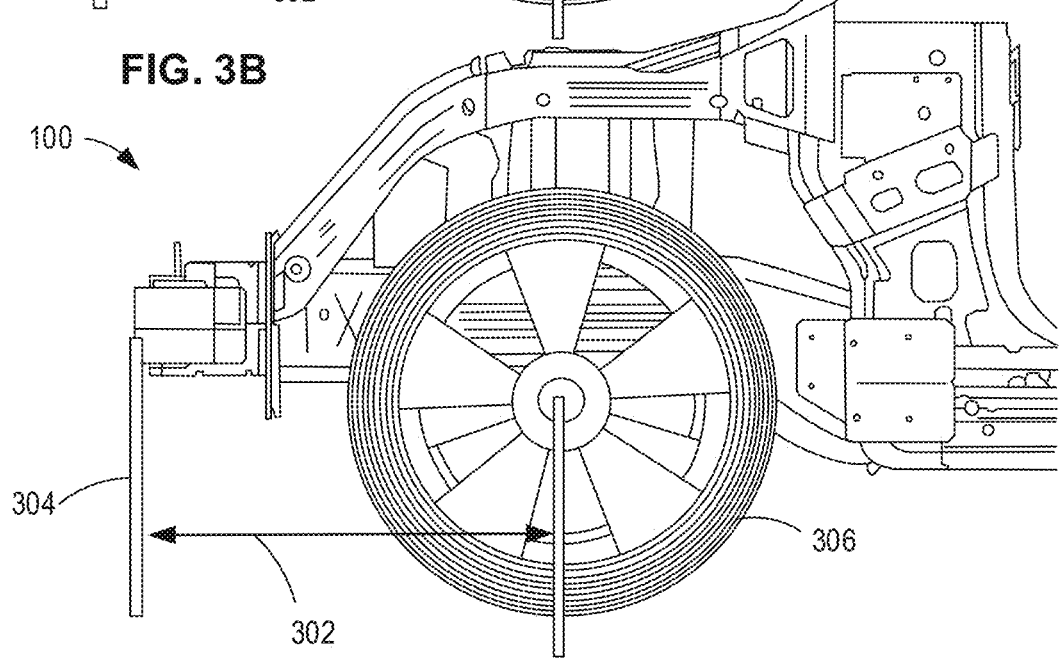
FIG. 3B illustrates a side view of the example vehicle of FIGS. 1A and/or 1B having a reduced length of the example overhang of FIG. 3A.

FIG. 3A illustrates a side view of the example vehicle 100 of FIGS. 1A and/or 1B. In the illustrated example of FIG. 3A, an example overhang 302 is measured between an example front end 304 of the vehicle 100 and an axle of an example front wheel 306. Similarly, FIG. 3B illustrates the side view of the vehicle 100 having a reduced length of the overhang 302. In this example, the length of the overhang 302 in FIG. 3B is reduced by approximately 55 millimeters (mm) from the length of the overhang 302 in FIG. 3A. In some examples, the length of the overhang 302 can be reduced to improve styling and/or aesthetics of the vehicle 100. However, in some such examples, reducing the length of the overhang 302 reduces an allowable deformation length of the vehicle 100 and can render the battery 202 more susceptible to damage and/or intrusion in the event of an impact on the vehicle 100.

Figure 4A:
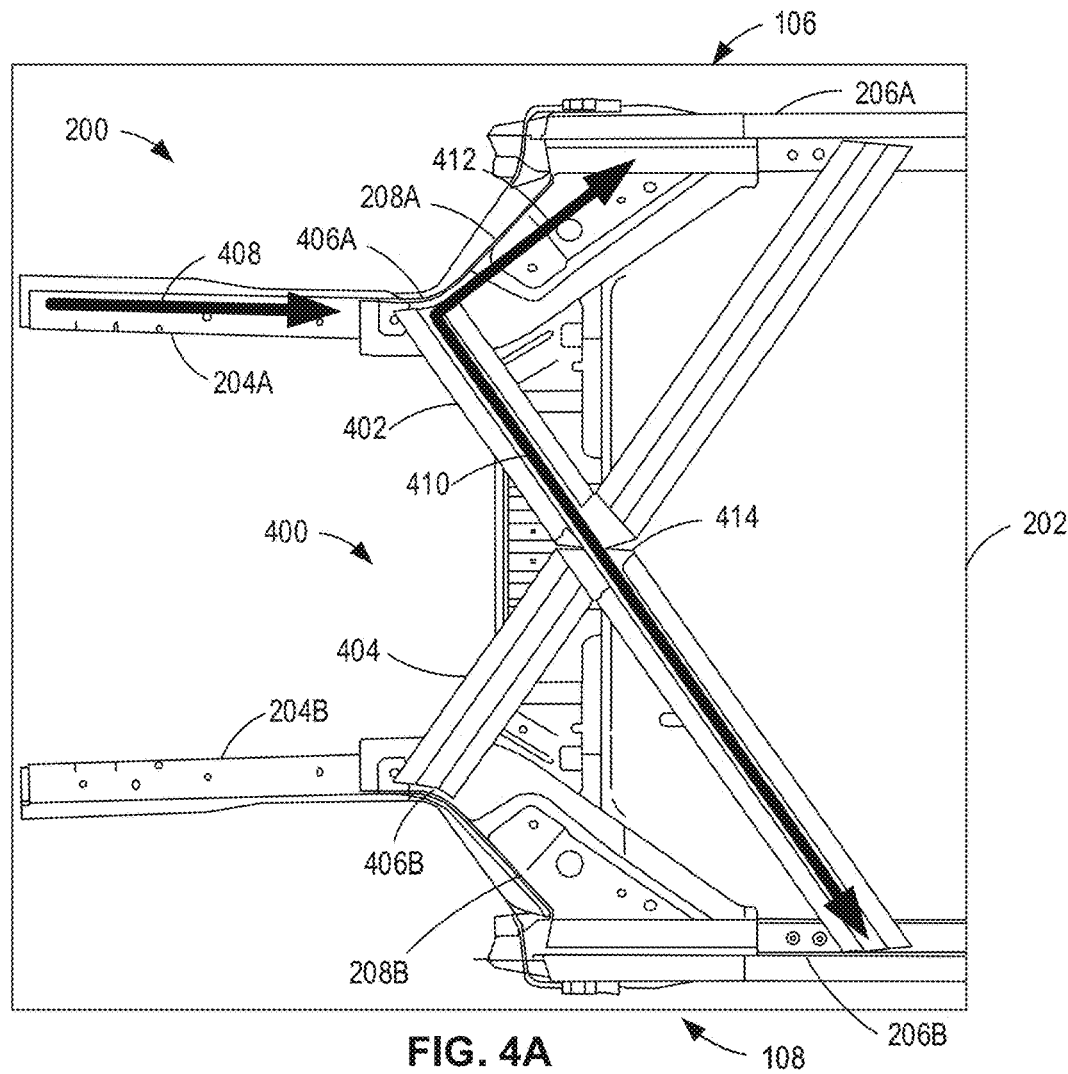
FIG. 4A illustrates a bottom view of an example brace in accordance with teachings of this disclosure.

FIG. 4A illustrates a bottom view of an example brace (e.g., diagonal load path brace) 400 in accordance with teachings of this disclosure. In the illustrated example of FIG. 4A, the brace 400 is implemented on the front end of the subframe 200 of FIGS. 2A and/or 2B to reduce deformation of the front end of the subframe 200 in the event of a front collision of the vehicle 100 of FIGS. 1A and/or 1B.

The brace 400 includes example first and second diagonal members 402, 404. The first diagonal member 402 is coupled to a first backup rail 208A at an example first bend (e.g., elbow, inner elbow) 406A of a first mid rail 204A, and the second diagonal member 404 is coupled to a second backup rail 208B at an example second bend 406B of a second mid rail 204B. Furthermore, the first diagonal member 402 is further coupled to a second rocker 206B and the second diagonal member 404 is further coupled to a first rocker 206A. In the illustrated example of FIG. 4A, the first mid rail 204A, the first rocker 206A, and the first backup rail 208A are on the left side 106 of the vehicle 100 opposite from the second mid rail 204B, the second rocker 206B, and the second backup rail 208B on the right side 108 of the vehicle 100.

In the illustrated example of FIG. 4A, the first diagonal member 402 can transfer an example load (e.g., longitudinal load) 408 from the left side 106 to the right side of the vehicle 100. In some examples, the load 408 is generated on the first mid rail 204A in response to a frontal collision of the vehicle 100. The load 408 is transferred from the first mid rail 204A to the first diagonal member 402 and the first backup rail 208A at the first bend 406A. In particular, an example first component (e.g., load component, lateral component) 410 of the load 408 is transferred from the first mid rail 204A to the second rocker 206B via the first diagonal member 402, and an example second component 412 of the load 408 is transferred from the first mid rail 204A to the first rocker 206A via the first backup rail 208A. As such, by directing the first component 410 of the load 408 away from the first backup rail 208A, the first diagonal member 402 can reduce a total load on the first backup rail 208A. Furthermore, the first diagonal member 402 can reduce deformation of the first backup rail 208A in the event of a frontal collision of the vehicle 100 and, as such, can reduce damage to the battery 202. Similarly, the second diagonal member 404 can reduce deformation of the second backup rail 208B by directing a component of a second load (not shown) from the second mid rail 204B to the first rocker 206A (e.g., away from the second backup rail 208B).

In the illustrated example of FIG. 4A, each of the first diagonal member 402 and the second diagonal member 404 includes three tubes. In other examples, a different number of the tubes can be used. In some examples, the tubes include a metal material (e.g., steel, aluminum). Each of the tubes can be bolted and/or welded to the first backup rail 208A and the second rocker 206B, or to the second backup rail 208B and the first rocker 206A. Additionally or alternatively, the tubes can be welded and/or otherwise coupled together to form the first diagonal member 402 and/or the second diagonal member 404. In this example, the tubes have a circular cross-section. In other examples, the tubes can have another shape of the cross-section (e.g., square, hexagonal, etc.). In some examples, the first diagonal member 402 and the second diagonal member 404 can be welded and/or bolted together at an example intersection 414 therebetween. In such examples, a portion of the first component 410 of the load 408 can be transferred from the intersection 414 to the first rocker 206A via the second diagonal member 404.

Figure 4B:
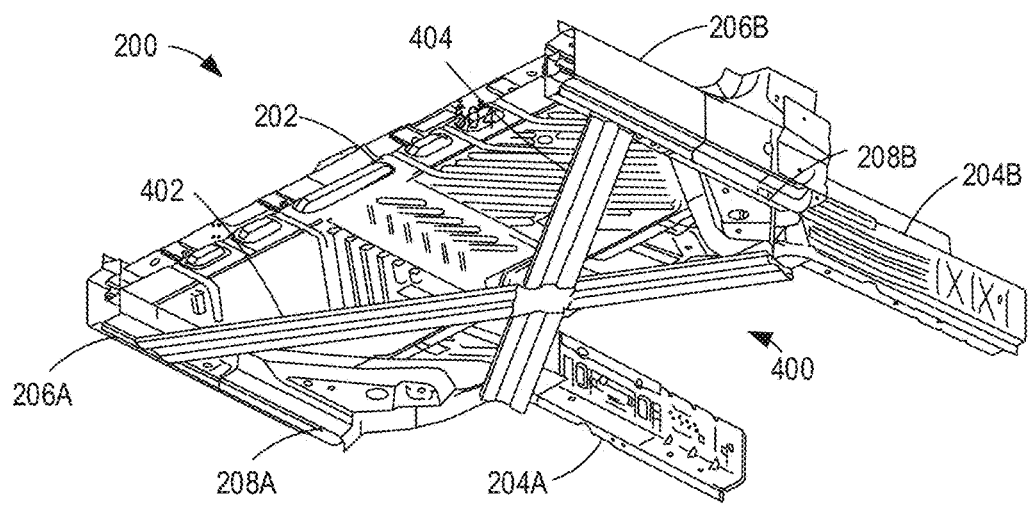
FIG. 4B illustrates the example brace of FIG. 4A.

FIG. 4B illustrates the example brace 400 of FIG. 4A. In the illustrated example of FIG. 4B, the first diagonal member 402 and the second diagonal member 404 are implemented on the front end of the subframe 200 at a distance below the battery 202. In this example, given the downward offset 212 of the front end of the subframe 200 shown in FIG. 2B, the first diagonal member 402 and the second diagonal member 404 are slanted downward from the mid rails 204A, 204B to the rockers 206A, 206B. As such, an offset between the battery 202 and the brace 400 reduces a ground clearance between the vehicle and the ground.

Figure 5:
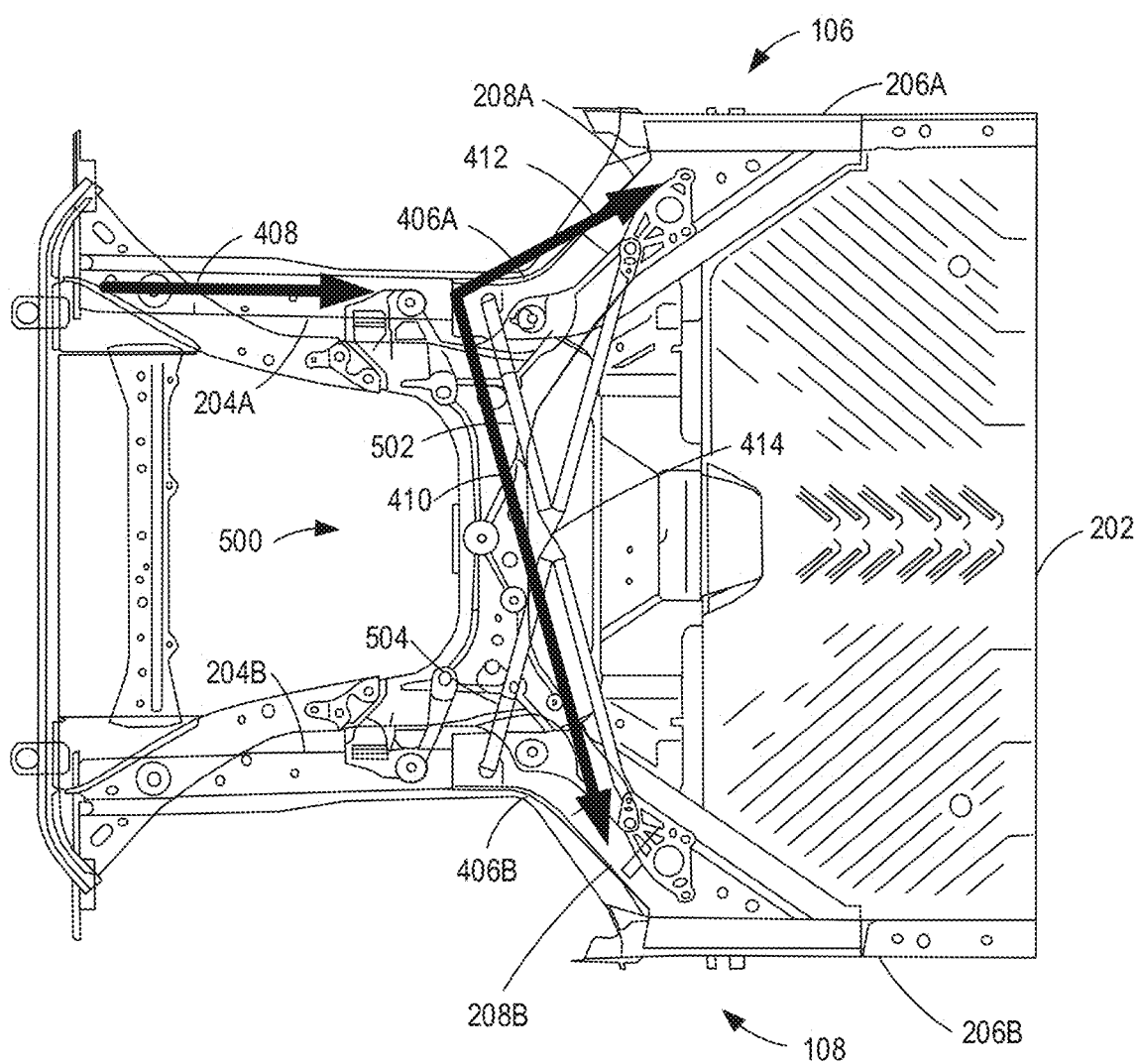
FIG. 5 illustrates an example single-tube brace in accordance with teachings of this disclosure.

FIG. 5 illustrates a single-tube brace 500 in accordance with teachings of this disclosure. The single-tube brace 500 of FIG. 5 can be implemented on the front end of the subframe 200 of FIGS. 2A and/or 2B in addition to or instead of the brace 400 of FIGS. 4A and/or 4B. In the illustrated example of FIG. 5, the single-tube brace 500 includes an example first diagonal member 502 and an example second diagonal member 504. While each of the first diagonal member 402 and the second diagonal member 404 of the brace 400 includes three tubes, the first diagonal member 502 and the second diagonal member 504 of the single-tube brace 500 in the illustrated example of FIG. 5 are shown having one tube. In other examples, a different number of tubes for the first diagonal member 502 and/or the second diagonal member 504 can be used. The first diagonal member 502 is coupled to the first backup rail 208A proximate the first bend 406A of the first mid rail 204A, and the second diagonal member 504 is coupled to the second backup rail 208B proximate the second bend 406B of the second mid rail 204B. Furthermore, the first diagonal member 502 is further coupled to the second backup rail 208B proximate an example second midpoint 606B of the second backup rail 208B, and the second diagonal member 504 is further coupled to the first backup rail 208A proximate a midpoint of the first backup rail 208A.

In the illustrated example of FIG. 5, the first diagonal member 502 can transfer the example load 408 from the first mid rail 204A to the first member 402 and to the first backup rail 208A at the first bend 406A. In particular, the first component 410 of the load 408 is transferred from the first mid rail 204A to the second backup rail 208B via the first diagonal member 502, and the second component 412 of the load 408 is transferred from the first mid rail 204A to the first rocker 206A via the first backup rail 208A. In such examples, the first component 410 of the load 408 can be further transferred to the second rocker 206B via the second backup rail 208B. As such, by directing the first component 410 of the load 408 away from the first backup rail 208A, the first diagonal member 502 can reduce a total load on the first backup rail 208A.

In the illustrated example of FIG. 5, the first diagonal member 502 is couplable to the second diagonal member 504 at the example intersection 414. In some examples, the first diagonal member 502 and the second diagonal member 504 can be welded and/or bolted together at the intersection 414. In some examples, the tubes corresponding to the first diagonal member 502 and the second diagonal member 504 can be flattened and/or crimped at the intersection 414 to reduce and/or modify a cross-section of the tubes.

Figure 6:
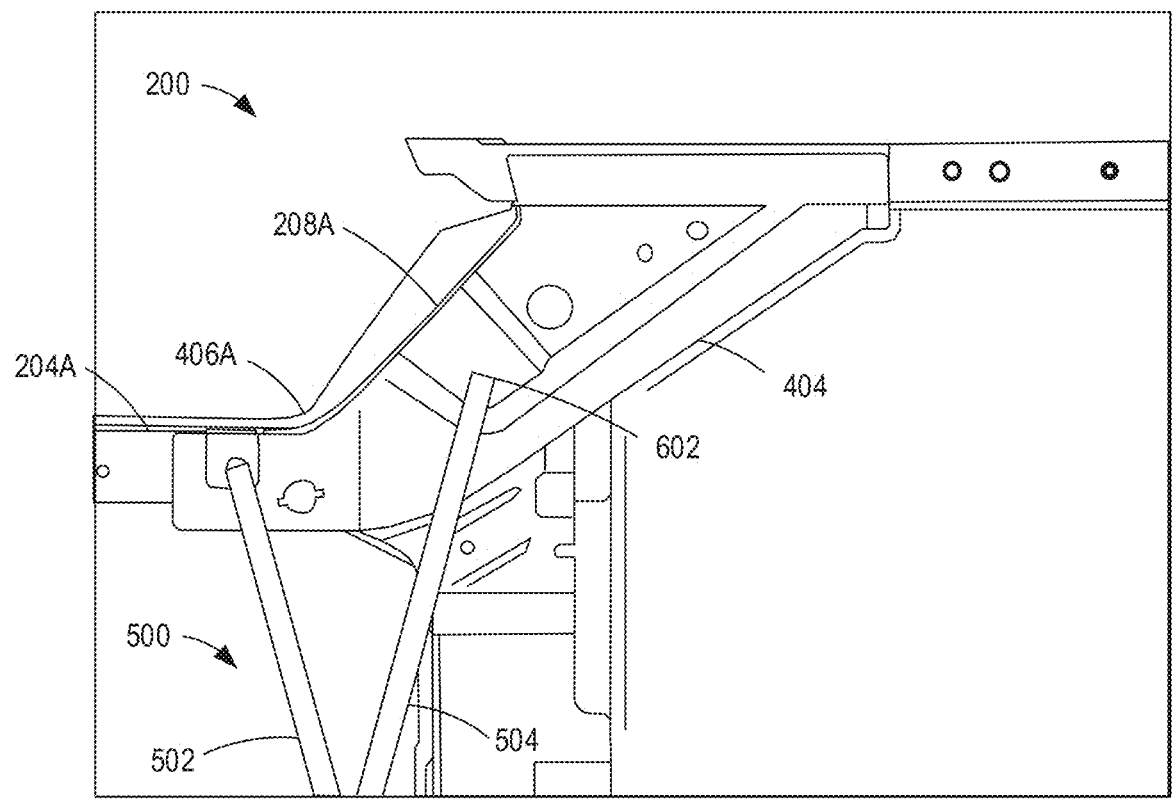
FIG. 6 illustrates an enlarged view of the example single-tube brace of FIG. 5.

FIG. 6 illustrates an enlarged view of the single-tube brace 500 of FIG. 5. In the illustrated example of FIG. 6, the first diagonal member 502 is bolted to the first mid rail 204A and/or the first backup rail 208A at a first location proximate a front of the backup rail 208A (e.g., at which the first backup rail 208A connects to the first mid rail 204A). Furthermore, the second diagonal member 504 is bolted to an example rear frame joint 602 proximate a midpoint of the first backup rail 208A. In some examples, the first diagonal member 502 can transfer a portion of a first longitudinal load on the first mid rail 204A away from a critical bending point (e.g., the first bend 406A) of the first backup rail 208A to reduce a load on the first backup rail 208A. Alternatively, the second diagonal member 504 can transfer a portion of a second longitudinal load on the second mid rail 204B shown in FIG. 5 to the rear frame joint 602. In such examples, the portion of the second longitudinal load on the rear frame joint 602 can be transferred via the first backup rail 208A to the first rocker 206A. By reducing a magnitude of the first longitudinal load and/or the second longitudinal load on the critical bending point of the first backup rail 208A, the deformation of the first backup rail 208A can be reduced.

In some examples, the brace 400 of FIGS. 4A and/or 4B may be more efficient at reducing deformation to the backup rails 208A, 208B compared to the single-tube brace 500. However, by coupling the first diagonal member 502 and the second diagonal member 504 at the backup rails 208A, 208B instead of at the rockers 206A, 206B, the single-tube brace 500 provides greater ground clearance compared to the brace 400.

Figure 7A:
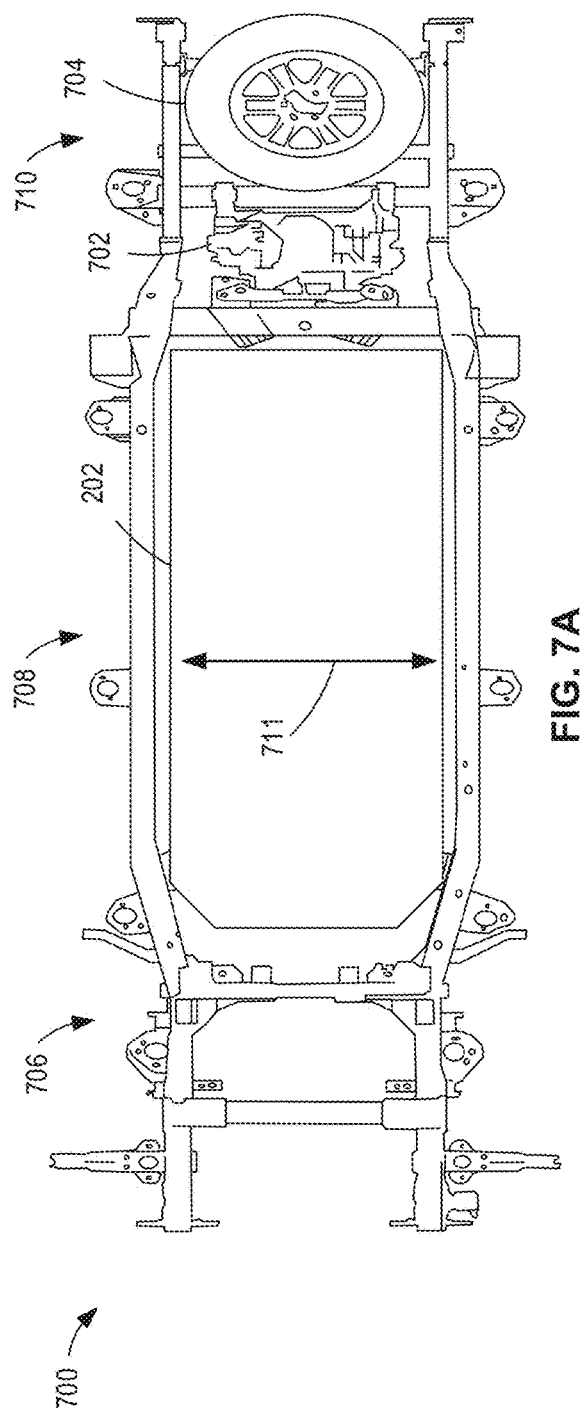
FIG. 7A illustrates an example base frame that can be implemented on the example vehicle of FIGS. 1A and/or 1B.

FIG. 7A illustrates an example base frame 700 that can be implemented on the example vehicle 100 of FIGS. 1A and/or 1B. The base frame 700 can support the battery 202, an example rear motor 702, and an example spare tire 704. In the illustrated example of FIG. 7A, the base frame 700 also includes an example front frame 706, an example mid frame 708, and an example rear frame 710. The battery 202 in the illustrated example of FIG. 7A is coupled to the mid frame 708 and extends longitudinally between the front frame 706 and the rear frame 710. In this example, the battery 202 of the base frame 700 has an example first width 711, where the first width 711 is approximately 950 millimeters. In other examples, the width can be different depending on a size of the vehicle 100.

Figure 7B:
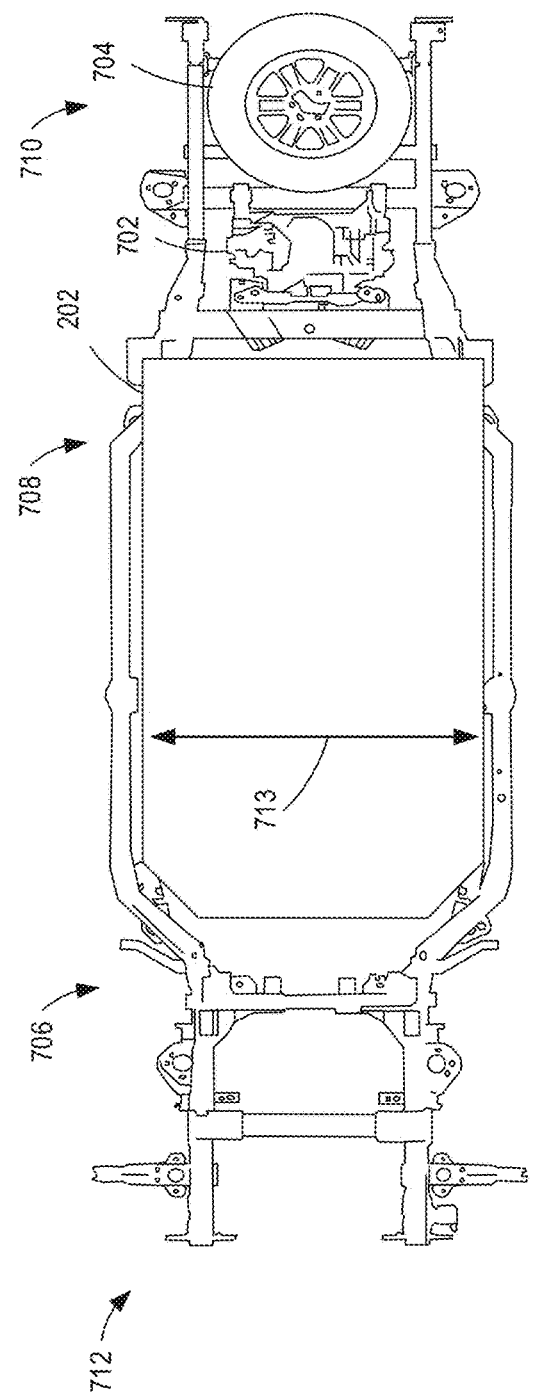
FIG. 7B illustrates an example widened frame that can be implemented on the example vehicle of FIGS. 1A and/or 1B.

FIG. 7B illustrates an example widened frame 712 that can be implemented on the example vehicle 100 of FIGS. 1A and/or 1B. Similar to the base frame 700 shown in FIG. 7A, the widened frame 712 supports the battery, 202, the rear motor 702, and the spare tire 704. Furthermore, the widened frame 712 includes the front frame 706, the mid frame 708, and the rear frame 710 as shown in FIG. 7A. In this example, an example second width 713 of the battery 202 implemented on the widened frame 712 is approximately 1350 millimeters, which is greater than the width of the battery 202 implemented on the base frame 700. Accordingly, the larger battery 202 of FIG. 7B can provide an increased travel range of the vehicle 100 for a single charge of the battery 202. Furthermore, in this example, the battery 202 of FIG. 7B has an increased weight compared to the battery 202 of FIG. 7A. In such examples, to accommodate the battery 202 having an increased width and weight, the widened frame 712 implements a larger width of the mid frame 708 compared to the base frame 700 of FIG. 7A. In some examples, the battery 202 implemented on the widened frame 712 can be more vulnerable to damage and/or deformation during a frontal collision of the vehicle 100 compared to the battery 202 on the base frame 700.

Figure 8:
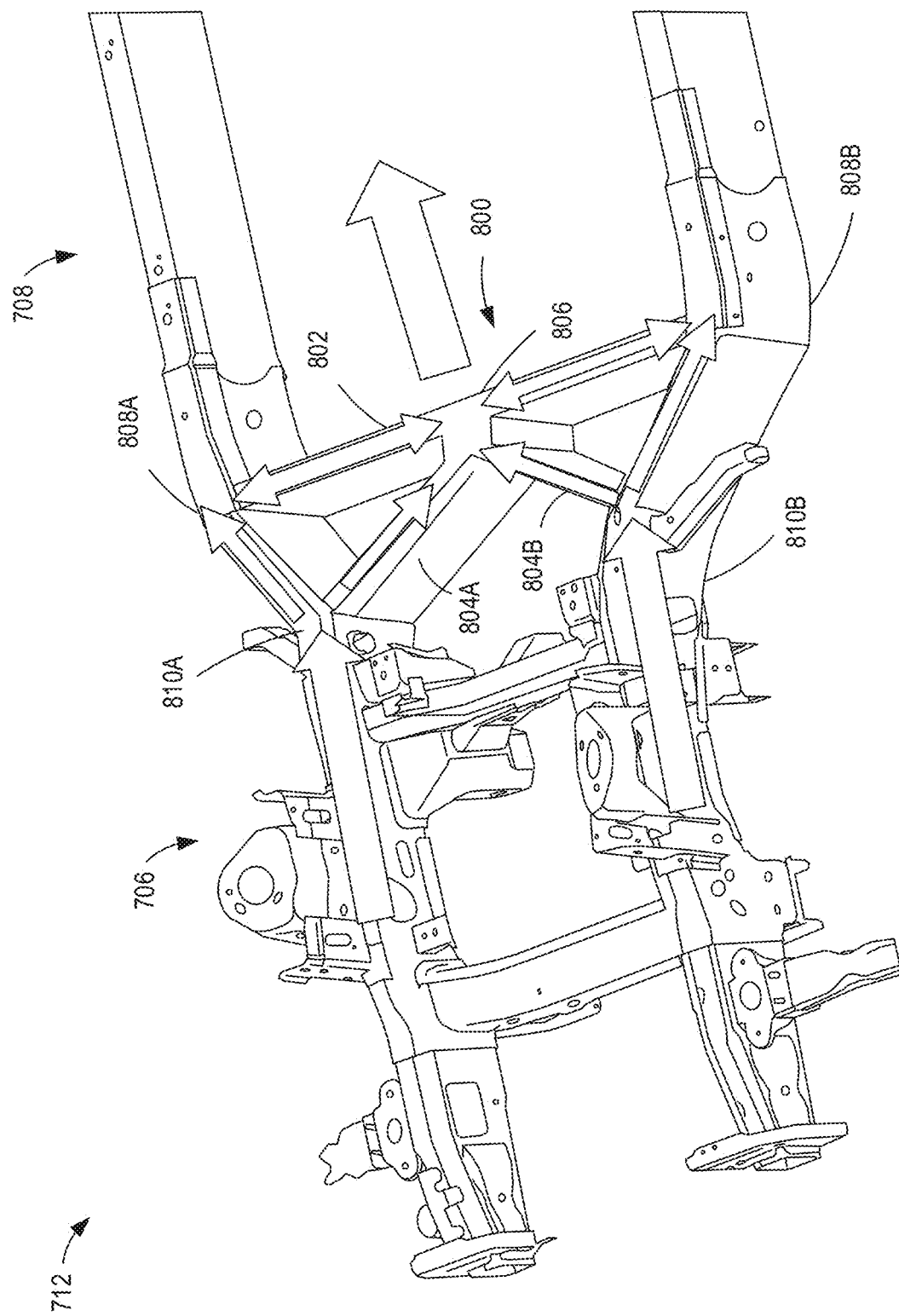
FIG. 8 illustrates an example truss-embedded cross-member in accordance with teachings of this disclosure.

FIG. 8 illustrates an example truss-embedded cross-member 800 in accordance with teachings of this disclosure. In examples disclosed herein, the truss-embedded cross-member 800 can be used to convert a longitudinal load on the widened frame 712 of FIG. 7B into one or more lateral loads along the truss-embedded cross-member 800. In the illustrated example of FIG. 8, the truss-embedded cross-member 800 is coupled between the front frame 706 and the mid frame 708 of the widened frame 712. In this example, the truss-embedded cross-member 800 includes an example lateral beam 802, an example first truss beam 804A coupled between the lateral beam 802 and the front frame 706 on the right side 108 of the vehicle 100, and an example second truss beam 804B coupled between the lateral beam 802 and the front frame 706 on the left side 106 of the vehicle 100. In some examples, the lateral beam 802 and the truss beams 804A, 804B are bolted and/or welded together at an example intersection 806. In other examples, the truss-embedded cross-member 800 is manufactured as a single piece.

In the illustrated example of FIG. 8, the lateral beam 1802 is bolted, welded, and/or otherwise coupled between example outer elbows 1808A, 1808B. Furthermore, each of the truss beams 1804 is bolted, welded, and/or otherwise coupled to a respective one of example inner elbows 1810A, 1810B. In this example, a load on the front frame 706 can be transferred to the mid frame 708 and/or the truss-embedded cross-member 800 to reduce deformation of the widened frame 712 and, thus, to reduce the possibility of damage to the battery 202.

Figure 9B:
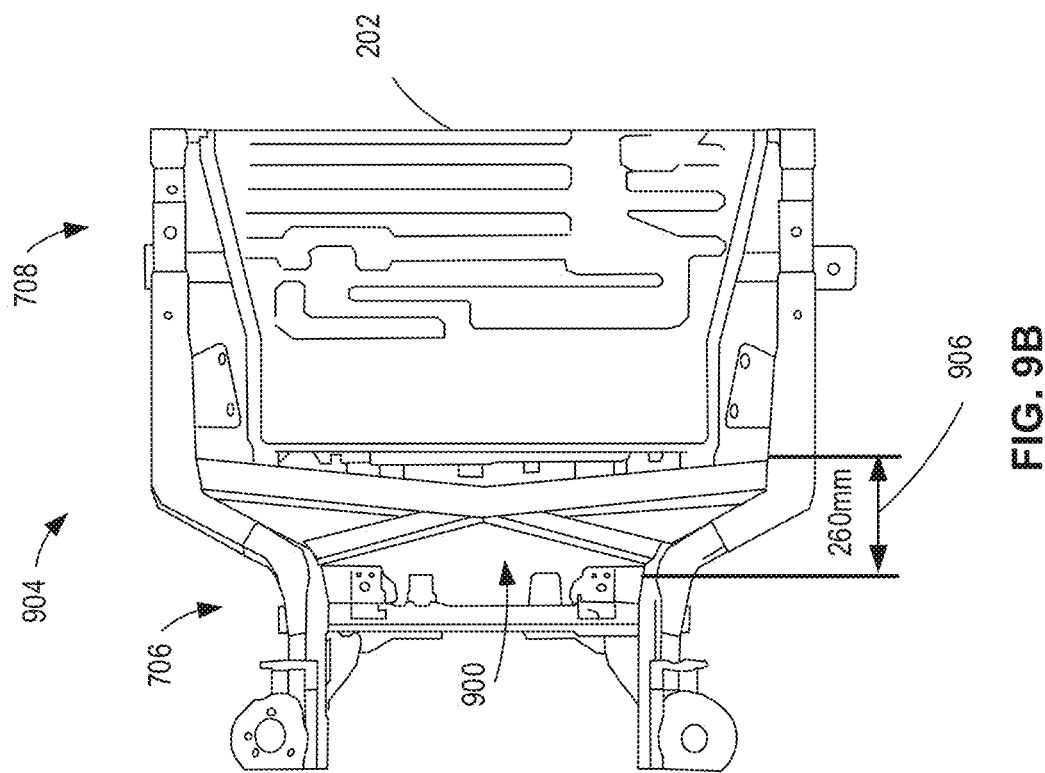
FIG. 9B illustrates an example forward-bent cross-member implemented on an example shortened frame.
Figure 9A:
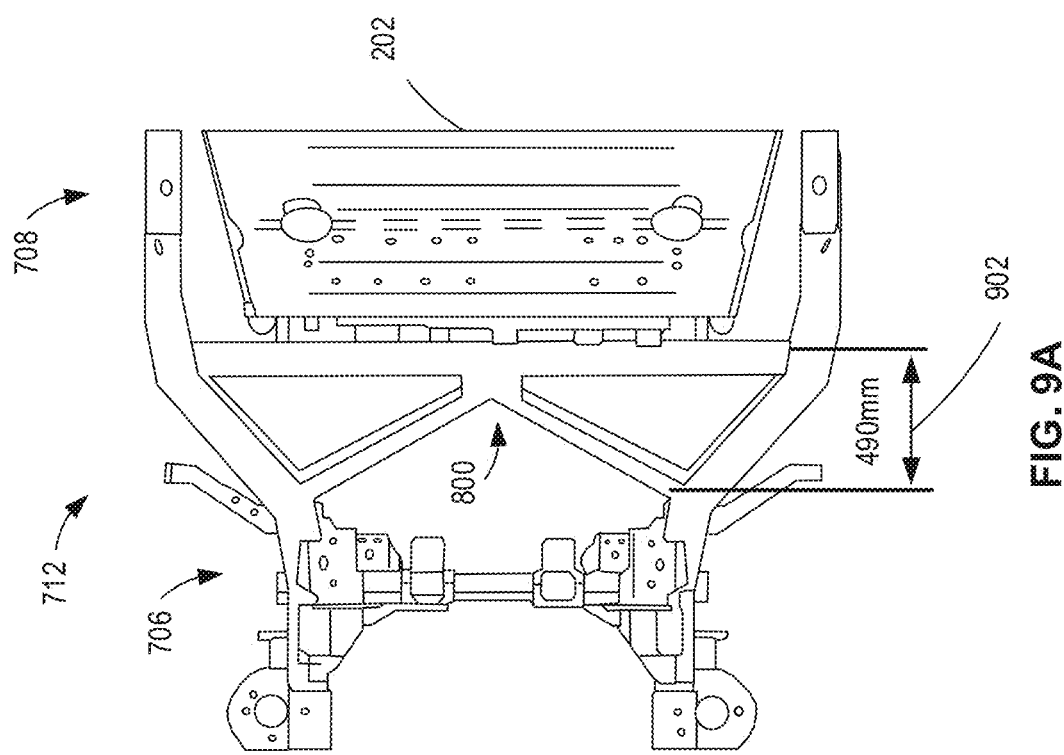
FIG. 9A illustrates the truss-embedded cross-member of FIG. 8 implemented on a vehicle frame.

FIGS. 9A and 9B illustrate the truss-embedded cross-member 800 of FIG. 8 and an example forward-bent cross-member 900, respectively, implemented on a vehicle frame. In the illustrated example of FIG. 9A, the truss-embedded cross-member 800 is implemented on the widened frame 712 of FIG. 7B. In this example, an example first distance 902 between the front frame 706 and the mid frame 708 of the widened frame 712 is approximately 500 millimeters. In other examples, the first distance 902 may be different.

Alternatively, in the illustrated example of FIG. 9B, the forward-bent cross-member 900 is implemented on an example shortened frame 904. In this example, an example second distance 906 between the front frame 706 and the mid frame 708 of the shortened frame 904 is less than the first distance 902 of FIG. 9A, where the second distance 906 is approximately 250 millimeters. In other examples, the second distance 906 may be different. In this example, the shortened frame 904 has substantially the same width as the widened frame 712, such that both the shortened frame 904 and the widened frame 712 can accommodate the battery 202 having the second width 713 of FIG. 7B (e.g., 1354 millimeters). As such, the both the shortened frame 904 and the widened frame 712 enable the vehicle 100 of FIGS. 1A and/or 1B to have an increased size of the battery 202, and thereby an increased travel range, compared to the vehicle 100 implementing the base frame 700 of FIG. 7A. Furthermore, the shortened frame 904 enables an increase in length of the battery 202 compared to the base frame 700 and/or the widened frame 712. As such, the shortened frame 904 can further increase the travel range of the vehicle 100 compared to the base frame 700 and/or the widened frame 712.

In the illustrated examples of FIGS. 9A and 9B, the distance (e.g., the first distance 902 and/or the second distance 906) between the front frame 706 and the mid frame 708 corresponds to a length of allowable deformation during frontal collision of the vehicle 100. For example, during frontal collision, loads applied to the front frame 706 can cause deformation of the shortened frame 904 and the widened frame 712 along the first and second distances 902, 906, respectively. When the deformation exceeds the length of allowable deformation, intrusion into the battery 202 may occur. As a result of the second distance 906 being less than the first distance 902, the battery 202 may be more vulnerable to intrusion in the shortened frame 904 compared to the widened frame 712. In some examples, the forward-bent cross-member 900 enables a reduction in deformation compared to the truss-embedded cross-member 800.

Figure 10A:
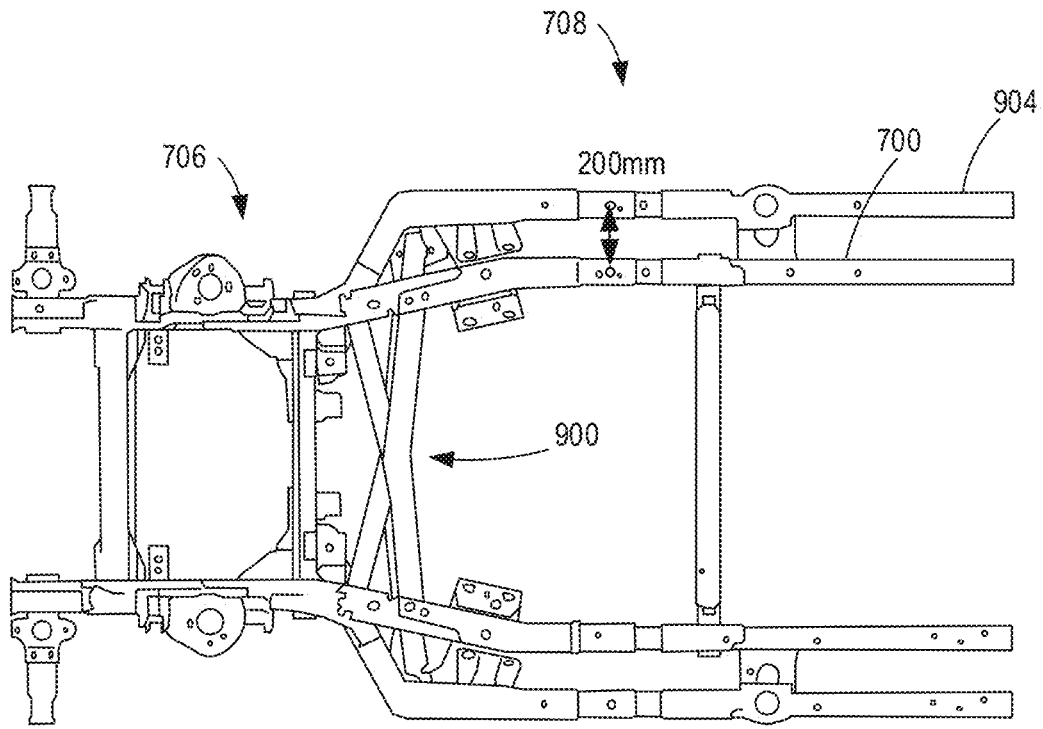
FIG. 10A illustrates the base frame of FIG. 7A compared to the shortened frame of FIG. 9B.
Figure 10B:
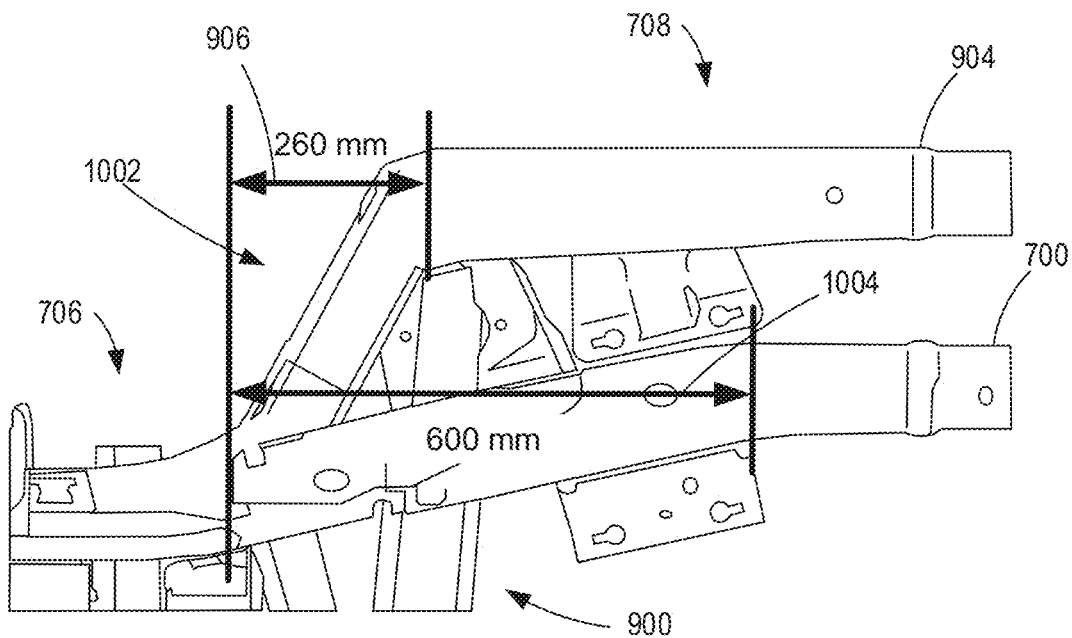
FIG. 10B illustrates an example curved portion of the base frame of FIG. 7A compared to the shortened frame of FIG. 9B.

FIG. 10A illustrates the base frame 700 of FIG. 7A compared to the shortened frame 904 of FIG. 9B. In the illustrated example of 10A, the front frame 706 has substantially the same width for both the base frame 700 and the shortened frame 904. Alternatively, mid frame 708 of the shortened frame 904 extends outward by approximately 200 millimeters compared to the base frame 700. Similarly, FIG. 10B illustrates an example curved portion 1002 of the base frame 700 compared to the shortened frame 904. In the illustrated example of FIG. 10B, the second distance 906 of the shortened frame 904 between the front frame 706 and the mid frame 708 is less than a corresponding example third distance 1004 of the base frame 700, where the second distance 906 is approximately 260 millimeters and the third distance 1004 is approximately 500 millimeters. As a result of the increased width and shortened deformation length, the shortened frame 904 enables an increase in battery size and, thus, an increase in travel range of the vehicle 100 of FIGS. 1A and/or 1B. However, the shortened frame 904 may be more vulnerable to deformation compared to the base frame 700. Thus, the forward-bent cross-member 900 can be implemented on the shortened frame 904 to prevent intrusion into the battery 202 during frontal collision of the vehicle 100.

Figure 11A:
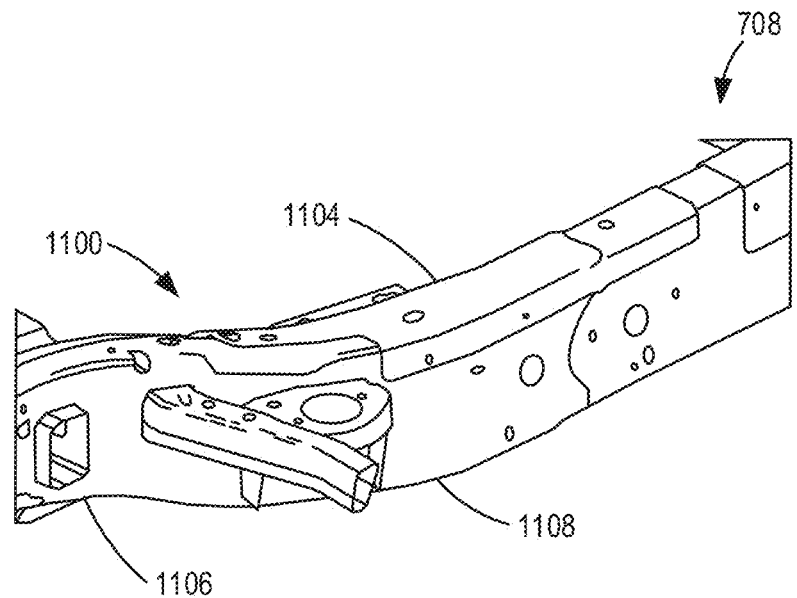
FIG. 11A illustrates an example first transition section of the base frame of FIG. 7A.
Figure 11B:
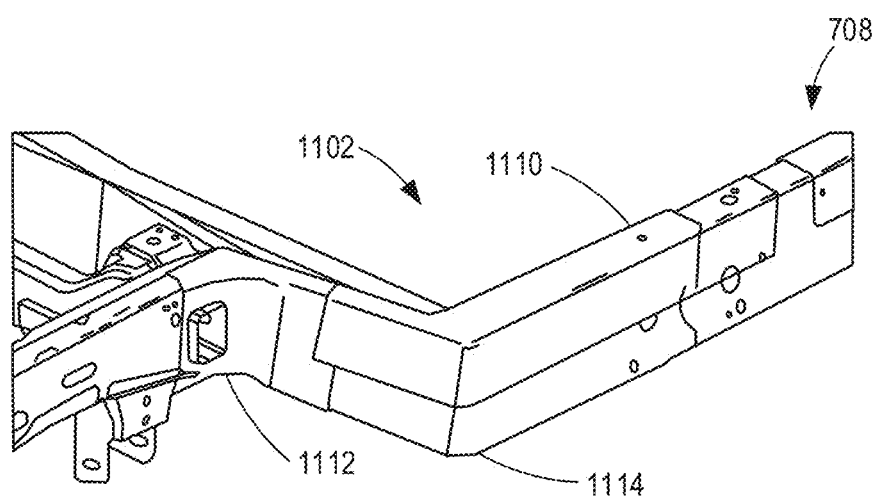
FIG. 11B illustrates an example second transition section of the shortened frame of FIG. 9B.

FIGS. 11A and 11B illustrate an example first transition section 1100 of the base frame 700 of FIG. 7A and an example second transition section 1102 of the shortened frame 904 of FIG. 9B, respectively. In the illustrated example of FIG. 11A, the first transition section 1100 is coupled between the front frame 706 and the mid frame 708. In this example, the first transition section 1100 includes an example first support rail 1104, where a first end of the first support rail 1104 is coupled to the mid frame 708, and a second end of the first support rail 1104 is coupled to the first transition section 1100 between an example first bend 1106 and an example second bend 1108. Similarly, in the illustrated example of FIG. 11B, an example second support rail 1110 is coupled to the second transition section 12102 between an example third bend (e.g., inner elbow) 1112 and an example fourth bend (e.g., outer elbow) 1114, and further coupled to the mid frame 708. In this example, the third and fourth bends 1112, 1114 of the second transition section 12102 are sharper (e.g., have a smaller bend radius) compared to the respective first and second bends 1106, 1108 of FIG. 11A.

In the illustrated examples of FIGS. 11A and 11B, the first and second support rails 1104, 1110 are constructed of a metal, such as a high strength low alloy (HSLA) steel. In some examples, a thickness of the first and second support rails 1104, 1110 is approximately 3 millimeters. In other examples, a different thickness may be used. The first and second support rails 1104, 1110 increase strength of the respective first and second transition sections 1100, 12102 to reduce deformation of the base frame 700 and/or the shortened frame 904 in the event of a frontal collision.

Figure 12:
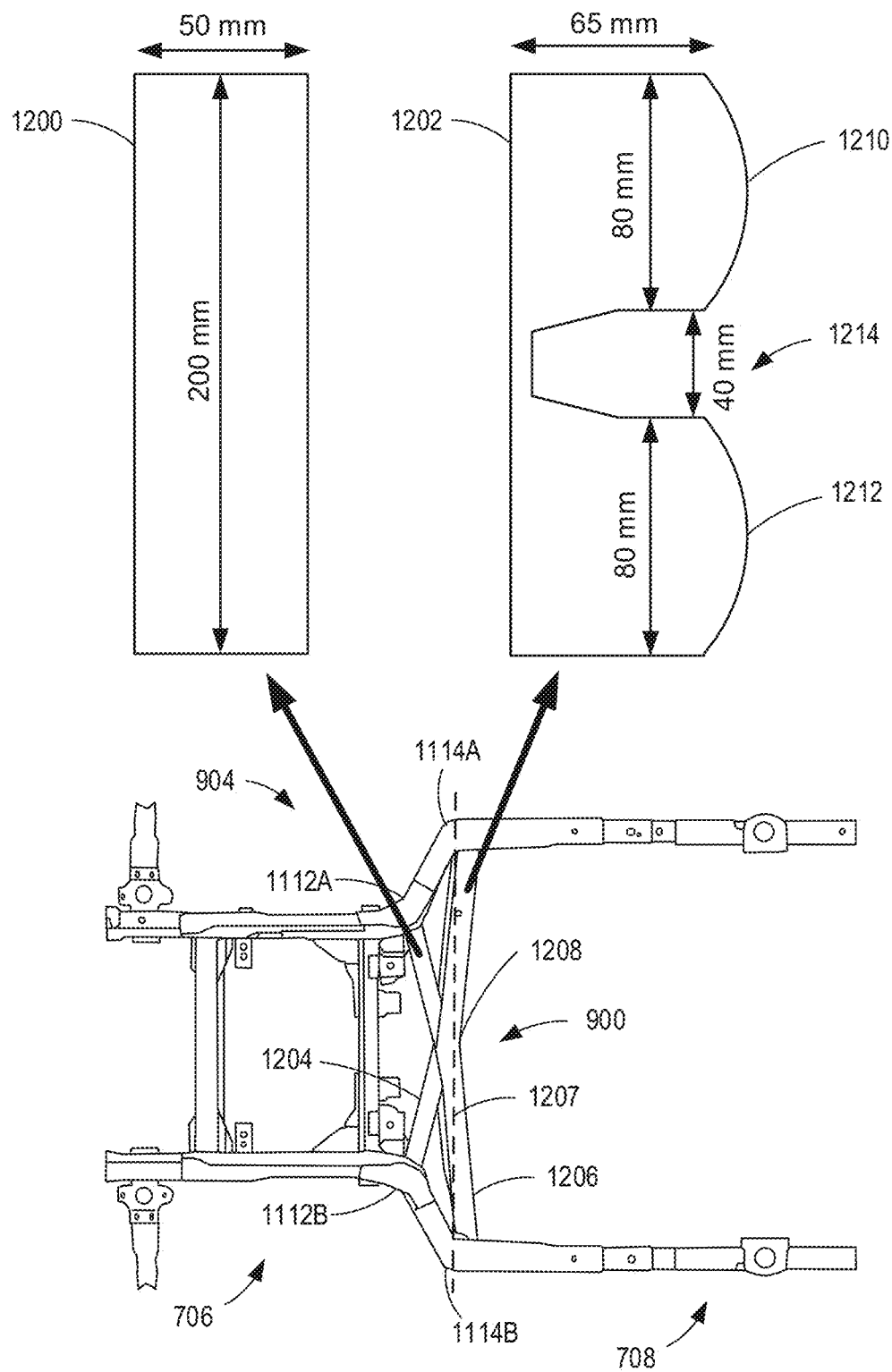
FIG. 12 illustrates an example first cross-section and an example second cross-section of the forward-bent cross-member implemented on the shortened frame of FIG. 9B.

FIG. 12 illustrates an example first cross-section 1200 and an example second cross-section 1202 of the forward-bent cross-member 900 implemented on the shortened frame 904 of FIG. 9B. In the illustrated example of FIG. 12, the forward-bent cross-member 900 includes an example first bent beam 1204 and an example second bent beam 1206. In some examples, the first bent beam 1204 has a first bending angle between 5 and 30 degrees, and the second bent beam 1206 has a second bending angle between 5 and 30 degrees, where the first bending angle and the second bending angle are relative to an example transverse axis 1207 of the shortened frame 904. The first bent beam 1204 is coupled between the third bends 1112A, 1112B, and the second bent beam 1206 is coupled between the fourth bends 1114A, 1114B. The first and second bent beams 1204, 1206 are coupled (e.g., welded, bolted) together at an example midpoint 1208. In the illustrated example of FIG. 12, the first bent beam 1204 bends in a rearward direction toward the midpoint 1208, and the second bent beam 1206 bends in a forward direction toward the midpoint 1208. In this example, the first bent beam 1204 transfers loads from the front frame 706 to the second bent beam 1206 at the midpoint 1208, and the second bent beam 1206 further transfers the loads to the mid frame 708. In the illustrated example of FIG. 12, each of the first and second bent beams 1204, 1206 is a single beam. In other examples, the first bent beam 1204 and/or the second bent beam 1206 includes two separate beams coupled together at the midpoint 1208.

In the illustrated example of FIG. 12, the first cross-section 1200 is rectangular with a width of 50 millimeters and a length of 200 millimeters. The second cross-section 1202 is rectangular with an example first rounded section 1210, an example second rounded section 1212, and an example cutout 1214 therebetween. In this example, each of the first and second rounded sections 1210, 1212 has a width of 65 millimeters and a length of 80 millimeters, and the cutout 1214 has a length of 40 millimeters. In other examples, each of the first and second cross-sections 1200, 1202 can have a different cross-sectional shape and/or different dimensions.

Figure 13:
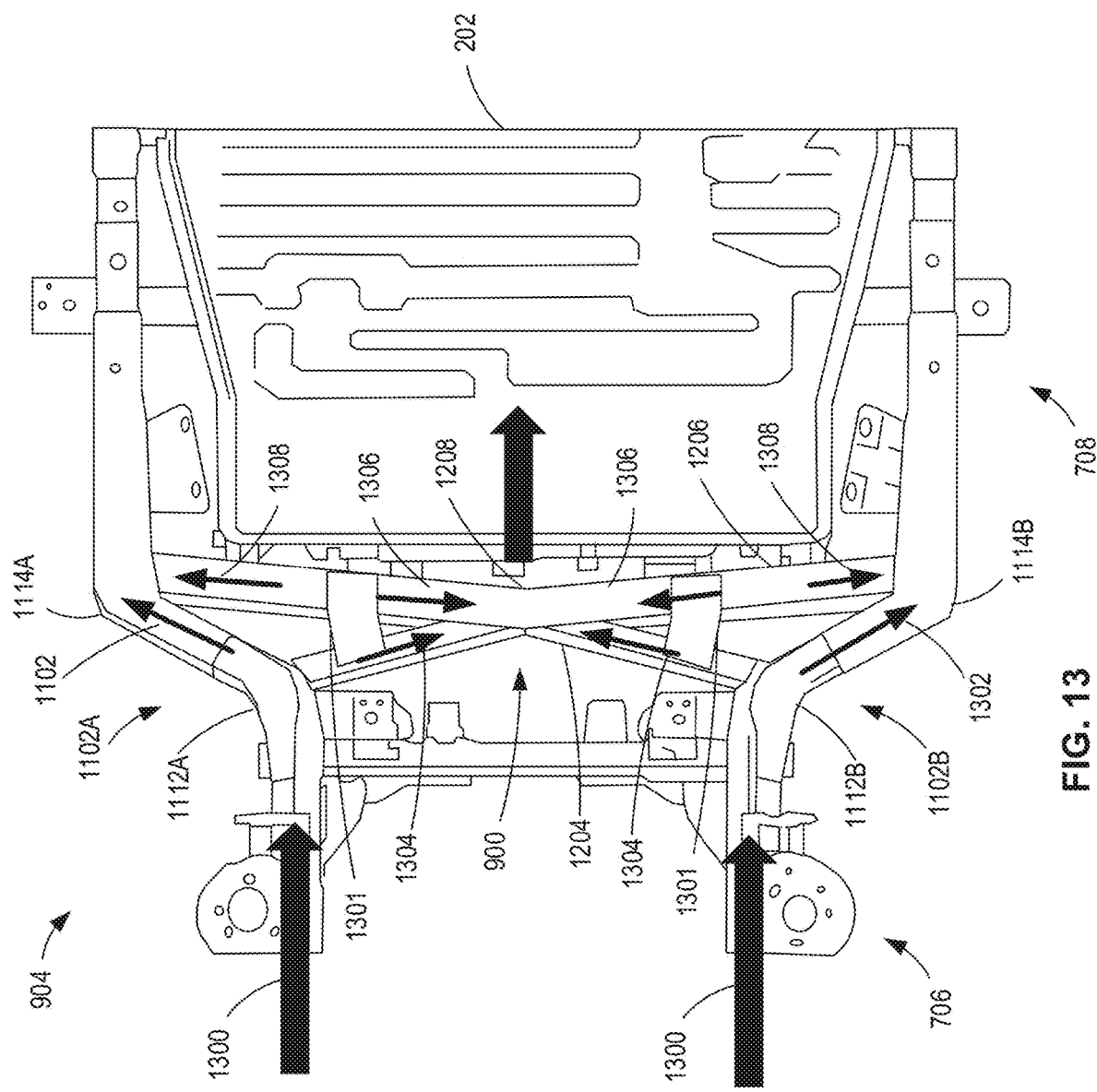
FIG. 13 illustrates an example load distribution on the example shortened frame of FIG. 9B implementing the example forward-bent cross-member.

FIG. 13 illustrates an example load distribution on the example shortened frame 904 of FIG. 9B implementing the example forward-bent cross-member 900. In the illustrated example of FIG. 13, example support brackets 1301 are coupled between the first and second bent beams 1204, 1206. In some examples, the support brackets 1301 reduce deformation of the first and second bent beams 1204, 1206 during a frontal collision.

In the illustrated example of FIG. 13, example loads 1300 are applied to the front frame 706 in response to a frontal collision of the vehicle 100 of FIGS. 1A and/or 1B. At the first bends 1112A, 1112B, the loads 1300 are transferred along the second transition sections 12102A, 12102B toward the second bends 1114A, 1114B as example first outward loads 1302, and are transferred along the first bent beam 1204 toward the midpoint 1208 as example first inward loads 1304. In this example, the loads 1300 also apply example second inward loads 1306 along the second bent beam 1206 toward the midpoint 1208. At the midpoint 1208, the second inward loads 1306 cancel an inward component of the first inward loads 1304, and the combination of the first and second inward loads 1304, 1306 results in example second outward loads 1308 along the second bent beam 1206 from the midpoint 1208 toward the second bends 1114A, 1114B. At the second bends 1114A, 1114B, the first and second outward loads 1302, 1308 are transferred to the mid frame 708. In some examples, the load distribution through the forward-bent cross-member 900 reduces a longitudinal load on the shortened frame 904, thereby reducing deformation of the shortened frame 904 in the event of a frontal collision.

Figure 14:
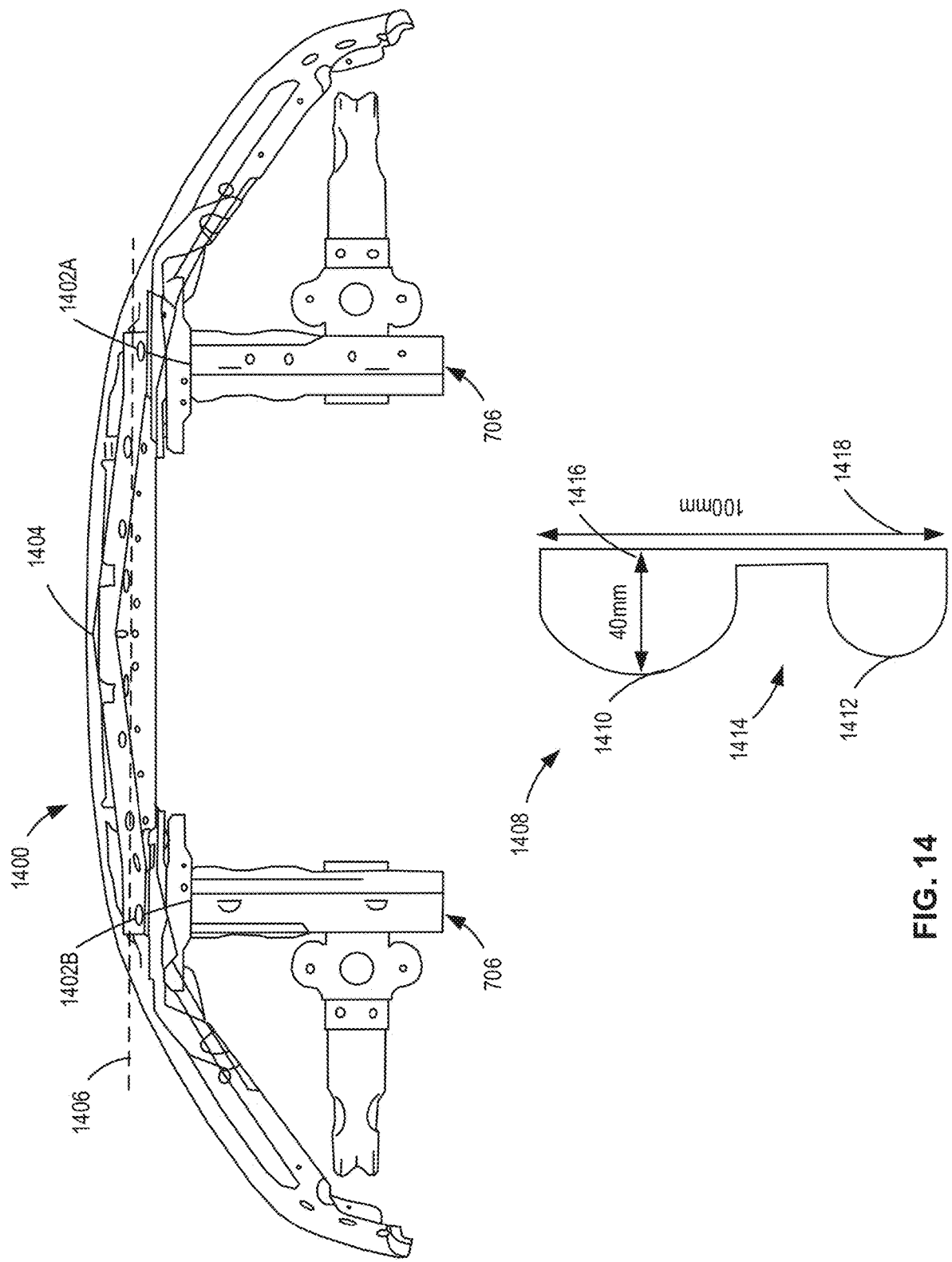
FIG. 14 illustrates an example front horn brace in accordance with teachings of this disclosure.

FIG. 14 illustrates an example front horn brace (e.g., V-shaped front horn brace) 1400 in accordance with teachings of this disclosure. In some examples, the front horn brace 1400 can be implemented on the base frame 700 of FIG. 7A, the widened frame 712 of FIG. 7B, and/or the shortened frame 904 of FIG. 9B. In this example, the front horn brace 1400 is welded and/or bolted between example first and second ends 1402A, 1402B of the front frame 706. The front horn brace 1400 includes a V-shaped forward bend toward an example point 1404 proximate a midpoint of the front horn brace 1400. In this example, the front horn brace 1400 points in a forward direction relative to the vehicle 100. In the event of a frontal collision, a longitudinal load is applied to the front horn brace 1400 at the point 1404. In such an example, the front horn brace 1400 can transfer the longitudinal load to the first and second ends 1402A, 1402B via one or more lateral loads.

In the illustrated example of FIG. 14, the V-shaped forward bend of the front horn brace 1400 is between 10 degrees and 15 degrees from an example lateral axis 1406 of the vehicle 100. In some examples, the V-shaped forward bend can be increased or reduced. In this example, an example brace cross-section 1408 is substantially rectangular and includes example first and second rounded sections 1410, 1412 and an example rectangular gap 1414 therebetween. In this example, a first width of the first rounded section 1410 is greater than a corresponding second width of the second rounded section 1412. Furthermore, an example first length 1416 of the brace cross-section 1408 is approximately 40 millimeters, and an example second length 1418 of the brace cross-section 1408 is approximately 100 millimeters. In other examples, first and second lengths 1416, 1418 can be different, and/or the front horn brace 1400 can have a different cross-sectional shape.

Figure 15:
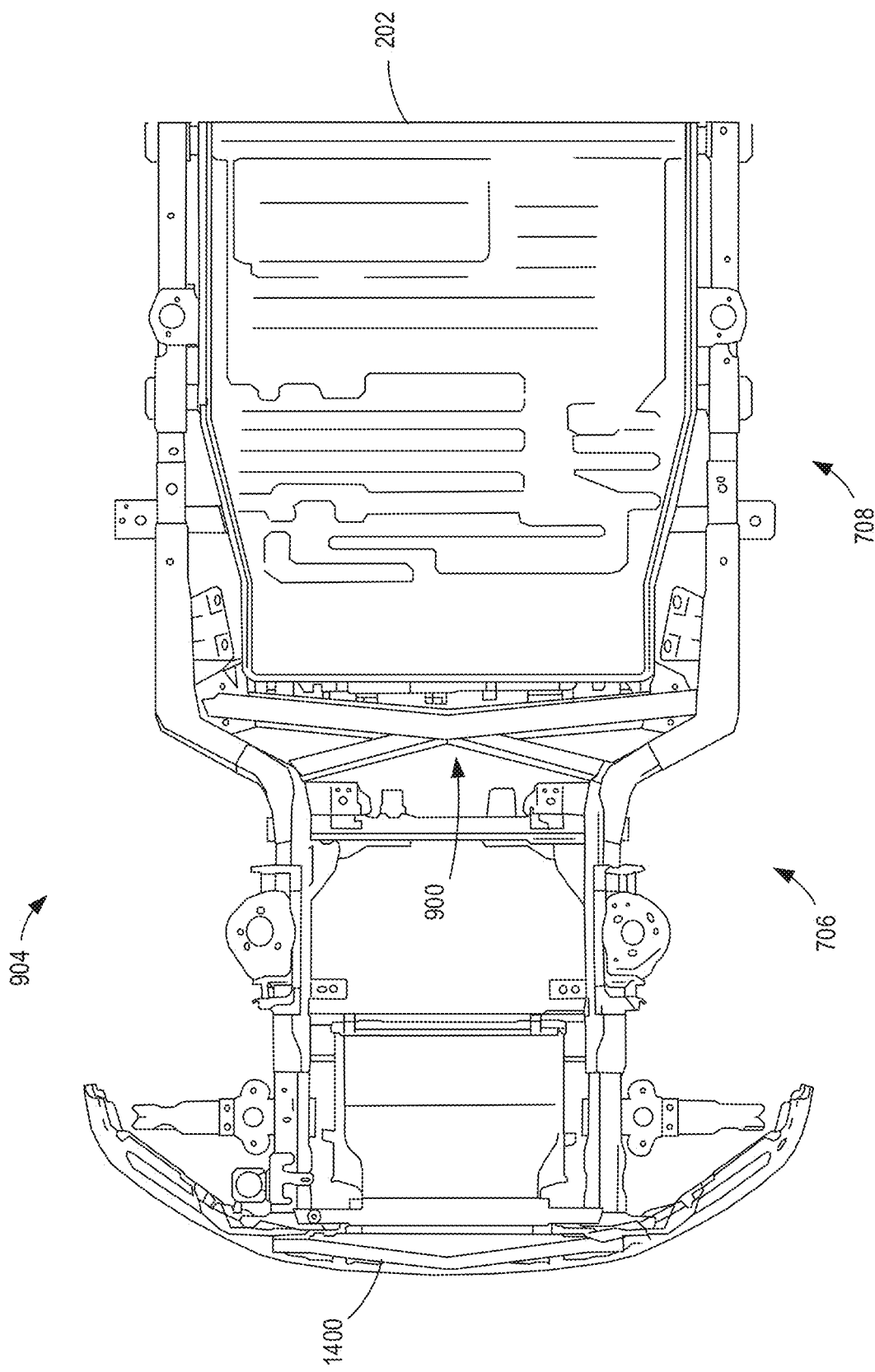
FIG. 15 illustrates the example front horn brace of FIG. 14 implemented on the shortened frame of FIG. 9B.

FIG. 15 illustrates the front horn brace 1400 implemented on the shortened frame 904 of FIG. 9B. In the illustrated example of FIG. 15, the shortened frame 904 further implements the forward-bent cross-member 900 of FIG. 9B. In this example, both the front horn brace 1400 and the forward-bent cross-member 900 prevent and/or reduce damage to the battery 202 in response to a frontal collision of the vehicle 100 of FIGS. 1A and/or 1B. For example, the front horn brace 1400 can deform in response to a longitudinal load on the front frame 706, such that a reduced longitudinal load is transferred through the front frame 706 to the forward-bent cross-member 900. The forward-bent cross-member 900 can further transfer the reduced longitudinal load to the mid frame 708 as described in connection with FIG. 13 above. In some examples, the deformation of the shortened frame 904 and, thus, damage to the battery 202 is reduced when implementing both the front horn brace 1400 and the forward-bent cross-member 900 compared to implementing only the front horn brace 1400 or only the forward-bent cross-member 900. Additionally or alternatively, the front horn brace 1400 can be implemented along with the example truss-embedded cross-member 800 of FIG. 8 and/or the example brace 400 of FIGS. 4A and/or 4B.

Figure 16A:
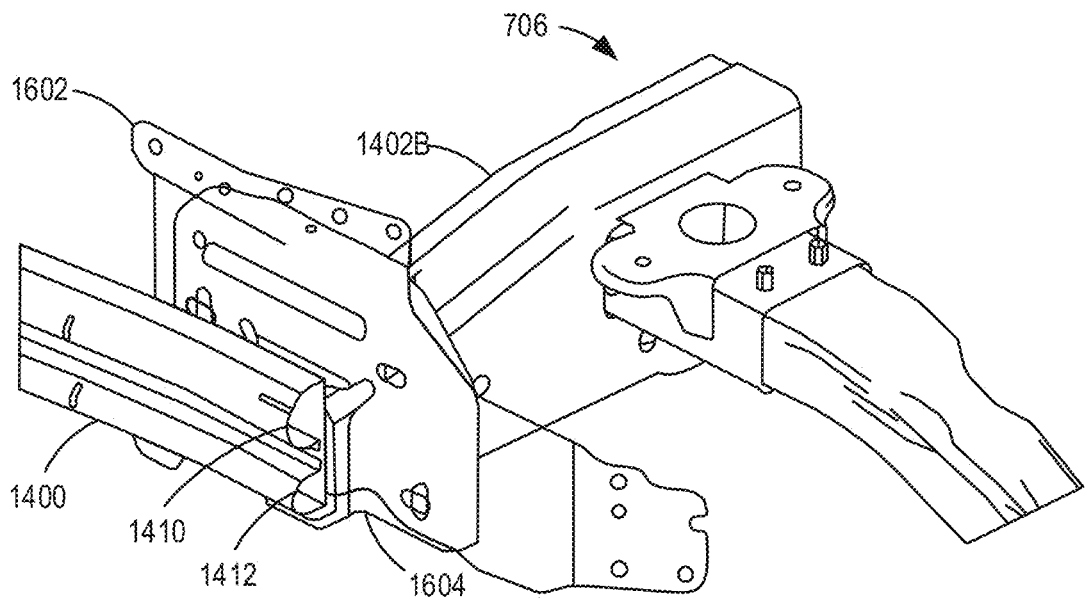
FIG. 16A illustrates an example first bracket coupled between the front horn brace and a second end of a front frame.
Figure 16B:
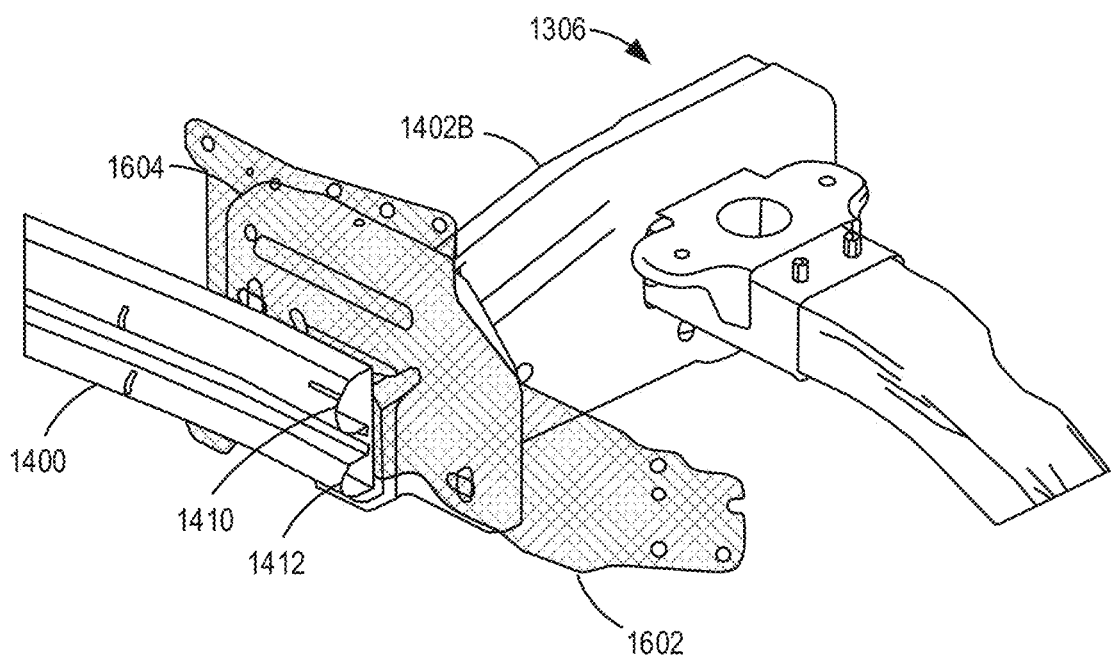
FIG. 16B illustrates an example second bracket coupled between the front horn brace and the second end of the front frame.

FIGS. 16A and 16B illustrate an example first bracket 1602 and an example second bracket 1604, respectively, coupled between the front horn brace 1400 and the second end 1402B of the front frame 706. Although FIGS. 16A and 16B are described in connection with the second end 1402B, the front horn brace 1400 can similarly be coupled to the first end 1402A using the first and second brackets 1602, 1604. In the illustrated examples of FIGS. 16A and 16B, the first bracket 1602 is coupled (e.g., bolted, welded) between the front horn brace 1400 and the second bracket 1604, and the second bracket 1604 is coupled between the first bracket 1602 and the front frame 706. The front horn brace 1400 is oriented such that the first and second rounded sections 1410, 1412 are directed outward towards a front of the vehicle 100 of FIGS. 1A and/or 1B.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that provide a vehicle subframe for a battery electric vehicle having an increased battery size. The disclosed methods, apparatus and articles of manufacture enable an increase in the size of the battery implemented on a vehicle, thereby increasing a travel range of the vehicle. Furthermore, examples disclosed herein reduce deformation of the vehicle subframe during collision of the vehicle, thereby reducing and/or preventing damage to the battery.

Example 1 includes an apparatus including a vehicle subframe including a first rail and a first rocker on a first side of the vehicle subframe, and a second rail and a second rocker on a second side of the vehicle subframe, the first side opposite the second side, a first diagonal member coupled between the first rail and the second side of the vehicle subframe, the first diagonal member to transfer a first longitudinal load from the first rail to the second side, and a second diagonal member coupled between the second rail and the first side of the vehicle subframe, the second diagonal member to transfer a second longitudinal load from the second rail to the first side.

Example 2 includes the apparatus of Example 1, where the first diagonal member and the second diagonal member are welded or bolted at an intersection.

Example 3 includes the apparatus of Example 2, where the first diagonal member is coupled to the first rail at a first elbow, and the second diagonal member is coupled to the second rail at a second elbow.

Example 4 includes the apparatus of Example 3, where the first diagonal member is coupled to the second side of the vehicle subframe at the second rocker, and the second diagonal member is coupled to the first side of the vehicle subframe at the first rocker.

Example 5 includes the apparatus of Example 3, further including a first backup rail and a second backup rail, the first backup rail coupled between the first rail and the first rocker, the second backup rail coupled between the second rail and the second rocker.

Example 6 includes the apparatus of Example 5. where the first diagonal member is coupled to the second side of the vehicle subframe at the second backup rail, and the second diagonal member is coupled to the first side of the vehicle subframe at the first backup rail.

Example 7 includes the apparatus of Example 1, where a cross-section of the first diagonal member and the second diagonal member is rectangular.

Example 8 includes the apparatus of Example 1, where the first diagonal member and the second diagonal member each includes at least one tube having a circular cross-section.

Example 9 includes a vehicle frame including a front frame coupled to a mid frame, a first bent beam coupled to the front frame, the first bent beam including a rearward bend at a midpoint of the first bent beam, and a second bent beam coupled to the mid frame, the second bent beam including a forward bend, the second bent beam coupled to the first bent beam at the midpoint.

Example 10 includes the vehicle frame of Example 9, wherein the first bent beam is to transfer a longitudinal load from the front frame to the second bent beam, and the second bent beam is to further transfer the longitudinal load to the mid frame.

Example 11 includes the vehicle frame of Example 9, where the first bent beam is coupled between inner elbows of the front frame.

Example 12 includes the vehicle frame of Example 11, where the second bent beam is coupled between outer elbows of the mid frame.

Example 13 includes the vehicle frame of Example 9, where a first cross-section of the first bent beam is rectangular, and a second cross-section of the second bent beam is rectangular with rounded sections and a cutout between the rounded sections.

Example 14 includes the vehicle frame of Example 9, further including support brackets between the first bent beam and the second bent beam.

Example 15 includes an apparatus including a frame of a vehicle, a truss-embedded cross-member coupled between a front frame and a mid frame of the frame, the truss-embedded cross-member to include, a lateral beam coupled between outer elbows of the mid frame, and truss beams coupled to the lateral beam at a midpoint of the lateral beam, and further coupled to inner elbows of the front frame, and a front horn brace coupled between a first end and a second end of the front frame, the front horn brace proximate a front of the vehicle.

Example 16 includes the apparatus of Example 15, where the front horn brace includes a V-shaped forward bend.

Example 17 includes the apparatus of Example 16, where the V-shaped forward bend is between 10 degrees and 15 degrees from a lateral axis of the vehicle.

Example 18 includes the apparatus of Example 15, where the front horn brace is welded or bolted to the first end and the second end of the front frame.

Example 19 includes the apparatus of Example 15, where a cross-section of the front horn brace is rectangular and includes a first rounded section and a second rounded section, a first width of the first rounded section different from a second width of the second rounded section.

Example 20 includes the apparatus of Example 15, where the front horn brace is to transfer a first longitudinal load to the front frame as a second longitudinal load, the second longitudinal load less than the first longitudinal load.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   a vehicle subframe including a first rail and a first rocker on a first side of the vehicle subframe, and a second rail and a second rocker on a second side of the vehicle subframe, the first side opposite the second side;
   a first diagonal member coupled between the first rail and the second side of the vehicle subframe, the first diagonal member to transfer a first longitudinal load from the first rail to the second side; and
   a second diagonal member coupled between the second rail and the first side of the vehicle subframe, the second diagonal member to transfer a second longitudinal load from the second rail to the first side, the first diagonal member coupled to the first rail at a first elbow, the second diagonal member coupled to the second rail at a second elbow.

2. The apparatus of claim 1, wherein the first diagonal member and the second diagonal member are welded or bolted at an intersection.

3. The apparatus of claim 1, wherein the first diagonal member is coupled to the second side of the vehicle subframe at the second rocker, and the second diagonal member is coupled to the first side of the vehicle subframe at the first rocker.

4. The apparatus of claim 1, further including a first backup rail and a second backup rail, the first backup rail coupled between the first rail and the first rocker, the second backup rail coupled between the second rail and the second rocker.

5. The apparatus of claim 4, wherein the first diagonal member is coupled to the second side of the vehicle subframe at the second backup rail, and the second diagonal member is coupled to the first side of the vehicle subframe at the first backup rail.

6. The apparatus of claim 1, wherein a cross-section of the first diagonal member and the second diagonal member is rectangular.

7. The apparatus of claim 1, wherein the first diagonal member and the second diagonal member each includes at least one tube having a circular cross-section.

8. A vehicle frame comprising:
   a front frame coupled to a mid frame, the front frame including inner elbows;

a first bent beam coupled to the front frame between the inner elbows, the first bent beam including a rearward bend at a midpoint of the first bent beam; and a second bent beam coupled to the mid frame, the second bent beam including a forward bend, the second bent beam coupled to the first bent beam at the midpoint.

9. The vehicle frame of claim 8, wherein the first bent beam is to transfer a longitudinal load from the front frame to the second bent beam, and the second bent beam is to further transfer the longitudinal load to the mid frame.

10. The vehicle frame of claim 8, wherein the mid frame includes outer elbows, the second bent beam coupled between the outer elbows.

11. The vehicle frame of claim 8, wherein a first cross-section of the first bent beam is rectangular, and a second cross-section of the second bent beam is rectangular with rounded sections and a cutout between the rounded sections.

12. The vehicle frame of claim 8, further including support brackets between the first bent beam and the second bent beam.

13. An apparatus comprising:
a frame of a vehicle;
a truss-embedded cross-member coupled between a front frame and a mid frame of the frame, the truss-embedded cross-member to include:
a lateral beam coupled between outer elbows of the mid frame; and
truss beams coupled to the lateral beam at a midpoint of the lateral beam, and further coupled to inner elbows of the front frame; and
a front horn brace coupled between a first end and a second end of the front frame, the front horn brace proximate a front of the vehicle.

14. The apparatus of claim 13, wherein the front horn brace includes a V-shaped forward bend.

15. The apparatus of claim 14, wherein the V-shaped forward bend is between 10 degrees and 15 degrees from a lateral axis of the vehicle.

16. The apparatus of claim 13, wherein the front horn brace is welded or bolted to the first end and the second end of the front frame.

17. The apparatus of claim 13, wherein a cross-section of the front horn brace is rectangular and includes a first rounded section and a second rounded section, a first width of the first rounded section different from a second width of the second rounded section.

18. The apparatus of claim 13, wherein the front horn brace is to transfer a first longitudinal load to the front frame as a second longitudinal load, the second longitudinal load less than the first longitudinal load.

* * * * *